US012495822B2

(12) United States Patent
Marangoni et al.

(10) Patent No.: US 12,495,822 B2
(45) Date of Patent: Dec. 16, 2025

(54) STRUCTURING AGENT FOR USE IN FOODS

(71) Applicant: Omnis Holdings Inc., Guelph (CA)

(72) Inventors: Alejandro Marangoni, Guelph (CA); Isaac Marangoni, Guelph (CA)

(73) Assignee: Omnis Holdings Inc., Guelph (CA)

(*) Notice: Subject to any disclaimer, the term of this patent is extended or adjusted under 35 U.S.C. 154(b) by 0 days.

(21) Appl. No.: 18/643,521

(22) Filed: Apr. 23, 2024

(65) Prior Publication Data

US 2025/0325011 A1    Oct. 23, 2025

(51) Int. Cl.
  *A23L 29/00*    (2016.01)
  *A23L 29/20*    (2016.01)
  *A23P 30/40*    (2016.01)

(52) U.S. Cl.
  CPC .............. *A23L 29/04* (2016.08); *A23L 29/20* (2016.08); *A23P 30/40* (2016.08)

(58) Field of Classification Search
  CPC ........... A23L 29/04; A23L 29/20; A23P 30/40
  See application file for complete search history.

(56) References Cited

FOREIGN PATENT DOCUMENTS

WO    WO-9209209 A1 *  6/1992  ........... A23C 19/053
WO    2015127388 A1    8/2015

OTHER PUBLICATIONS

International Search Report dated Jun. 28, 2024—PCT/CA2024/050488.
Written Opinion dated Jun. 28, 2024—PCT/CA2024/050488.
A.F.G. Leontowich, A. Gomez, B. Diaz Moreno, D. Muir, D. Spasyuk, G. King, J.W. Reid, C.Y. Kim, S. Kycia, The lower energy diffraction and scattering side-bounce beamline for materials science at the Canadian Light Source, Journal of Synchrotron Radiation, 28 (2021) 961-969.
R.B. Von Dreele, Small-angle scattering data analysis in GSAS-II, Journal of Applied Crystallography, 47 (2014) 1784-1789.
B.H. Toby, R.B. Von Dreele, GSAS-II: the genesis of a modern open-source all purpose crystallography software package, Journal of Applied Crystallography, 46 (2013) 544-549.
J. Borné, T. Nylander, A. Khan, Phase behavior and aggregate formation for the aqueous monoolein system mixed with sodium oleate and oleic acid, Langmuir 17 (2001) 7742-7751, DOI: 10.1021/la010650w.
Stobbs, J.A., Pensini, E., Ghazani, S.M., Leontowich, A.F., Quirk, A., Tu, K., Prévost, S., Mahmoudi, N., Fameau, A.L. and Marangoni, A.G. Phospholipid Self-Assembly in Cocoa Butter Provides a Crystallizing Surface for Seeding the Form V Polymorph in Chocolate. Crystal Growth & Design 24 (2024) 2685-2699.

(Continued)

Primary Examiner — Katherine D Leblanc
(74) Attorney, Agent, or Firm — Gowling WLG (Canada) LLP

(57) ABSTRACT

A formulation comprising a structuring agent is provided for use in foods. The formulation comprises the ingredients:
  i) a monoglyceride;
  ii) a fatty acid salt; and
  iii) a solvent,
  wherein the ingredients are combined and form a liquid crystalline lamellar phase above the Krafft temperature of the monoglyceride, a solid crystalline phase below the Krafft temperature of the monoglyceride. The formulation is useful to prepare food products including foam-based products.

18 Claims, 25 Drawing Sheets

(56) References Cited

OTHER PUBLICATIONS

Clarke, C. (2004). The Science of Ice Cream. Royal Society of Chemistry, Cambridge, U.K., pp. 204. https://doi.org/10.1039/9781847552150.
Goff, Harry Douglas, & Hartel, R. W. (2013). Ice cream. Springer, N.Y., USA, pp. 462.
Liu, X., Sala, G. and Scholten, E. 2023. Role of polysaccharide structure in the rheological, physical and sensory properties of low-fat ice cream. Current Research in Food Science 7: 100531
Qiu, H. and Caffrey, M. 2000. The phase diagram of the monoolein/water system: metastability and equilibrium aspects. Biomaterials 21: 223-234.

\* cited by examiner

STRUCTURING AGENT FOR USE IN FOODS

BACKGROUND OF THE INVENTION

Foams have been used in many forms in the history of cooking. Edible foams essentially consist of two phases, an aqueous phase and a gaseous (air) phase. Such foams provide structure to foods. To form a stable foam, a surfactant, monoglycerides or proteins, must be present to reduce the interfacial tension between the gaseous phase and the aqueous phase. Common edible foams, include, but are not limited to, for example: whipped cream, ice cream, cakes, meringue, soufflés, mousse and marshmallow.

Ice cream is a semi-solid product made with seven basic ingredients: fat, from dairy or non-dairy sources, milk solids-not-fat (MSNF) which is a source of protein, sweeteners, stabilizers, emulsifiers, water, and flavors, some of which contribute to the structure of the final product. Fat content is important for product texture, coating ice crystals and trapping air to prevent clumping and to maintain a smooth texture. Fat also contributes to structure retention and premature melt prevention; however, going beyond a particular fat threshold has an adverse effect on melt, stability and texture of the product. MSNF help to provide the product with body and a smooth texture by promoting emulsification of fat, foam creation, stabilization of air bubbles, and raising viscosity. Although milk and skim milk are naturally high in MSNF, additional MSNF sources are generally required to provide sufficient stabilization of the product. Stabilizers and emulsifiers influence consistency, stability, and overall quality of the finished product. High molecular weight polysaccharides are exemplary stabilizers that possess exceptional capacity to bind proteins, lipids, and water, and are generally provided in hydrocolloids such as carrageenan, gums, pectin, or gelatin. Stabilizers promote homogeneity and integrity in the finished product by inhibiting large ice crystal formation, maintaining air bubble stability, and preventing phase separation. Additionally, stabilizers facilitate the formation of a gel-like network in the product to provide a creamy, smooth texture. Emulsifiers, such as polysorbates, lecithin, and mono- and diglycerides, function to maintain the fat and water phase emulsion. Together, stabilizers and emulsifiers are balanced to produce a product having a smooth mouthfeel, a stable structure, and quality retention during storage. A variety of sweeteners may be used, such as cane and beet sugars, different corn sweeteners, maple sugar, honey, invert sugar, fructose, molasses, malt syrup, brown sugar, and lactose. Not only does the amount of sweetener control the sweetness of the product, but it also impacts melting point; sugars depress the freezing and melting points of water. Thus, too much sweetener may result in a product with an unsatisfactory melt profile. Flavouring agents may also be incorporated to provide a variety of end-products. Finally, water primarily functions as a solvent to dissolve and evenly distribute the other ingredients within the product, such as the sugars, stabilizers, emulsifiers, and other soluble substances. The water content also has a role to play on the hardness of the final product.

The interaction of the components in ice cream and the levels of its components are important to achieve partial coalescence of the fat networks that yield desired textural rheological properties. Thus, the total amount of fat, the size distribution of fat droplets, the solid fat content at whipping or freezing temperature, the kind of protein present at the fat interface, the amount and kind of emulsifier used, and the shear forces produced during dynamic freezing or whipping time in batch freezers are some of the factors that contribute to the optimal level of partial coalescence of fat globules.

There is an ongoing demand for healthier dietary alternatives, including lower fat options and dairy substitutes. Due to the complexity of colloidal systems, for example in ice creams and indeed that of any foam-based food product, there is a need for the development of improved, higher quality alternatives having acceptable nutritional, textural and sensory characteristics.

SUMMARY OF THE INVENTION

The present invention relates generally to novel food products, including novel foam-based foods.

Novel formulations that yield structuring agents useful in food products including foam-based food products have been developed which yield products having a stable structure without high fat contents.

In one aspect of the invention, a formulation comprising a structuring agent is provided comprising as ingredients:
  i) a monoglyceride;
  ii) a fatty acid salt; and
  iii) a solvent,
wherein the ingredients are combined and form a liquid crystalline lamellar phase above the Krafft temperature of the monoglyceride and fatty acid salt, and a solid crystalline phase below the Krafft temperature of the monoglyceride and fatty acid salt.

In another aspect, a food product is provided comprising a structuring agent as defined above.

In another aspect, a method of making a structuring agent is provided. The method comprises the steps of:
  i) heating a mixture of a monoglyceride and fatty acid salt to a temperature above the Krafft temperature of the monoglyceride and fatty acid salt to form a solution comprising a lamellar structure in a liquid crystalline state; and
  ii) cooling the solution to yield the structuring agent.

In a further aspect, a method of making a foam-based product is provided comprising introducing air into a structuring agent solution to form the foam-based product.

In another aspect, a product is provided comprising a monoglyceride and a fatty acid salt in powder form, wherein the ratio of monoglyceride to fatty acid is about 80-99 wt % monoglyceride to 1-20 wt % fatty acid salt.

In a further aspect, a gel concentrate is provided comprising a monoglyceride and a fatty acid salt complex in the form of a liquid crystalline lamellar phase within a solvent, wherein the ratio of monoglyceride to fatty acid salt in the complex is about 80-99 wt % monoglyceride to 1-20 wt % fatty acid salt and the solvent is an aqueous-based solvent or a polyol.

These and other aspects of the invention are described in detail herein in the description that follows and by reference to the following figures.

DETAILED DESCRIPTION OF THE INVENTION

Figure 1:
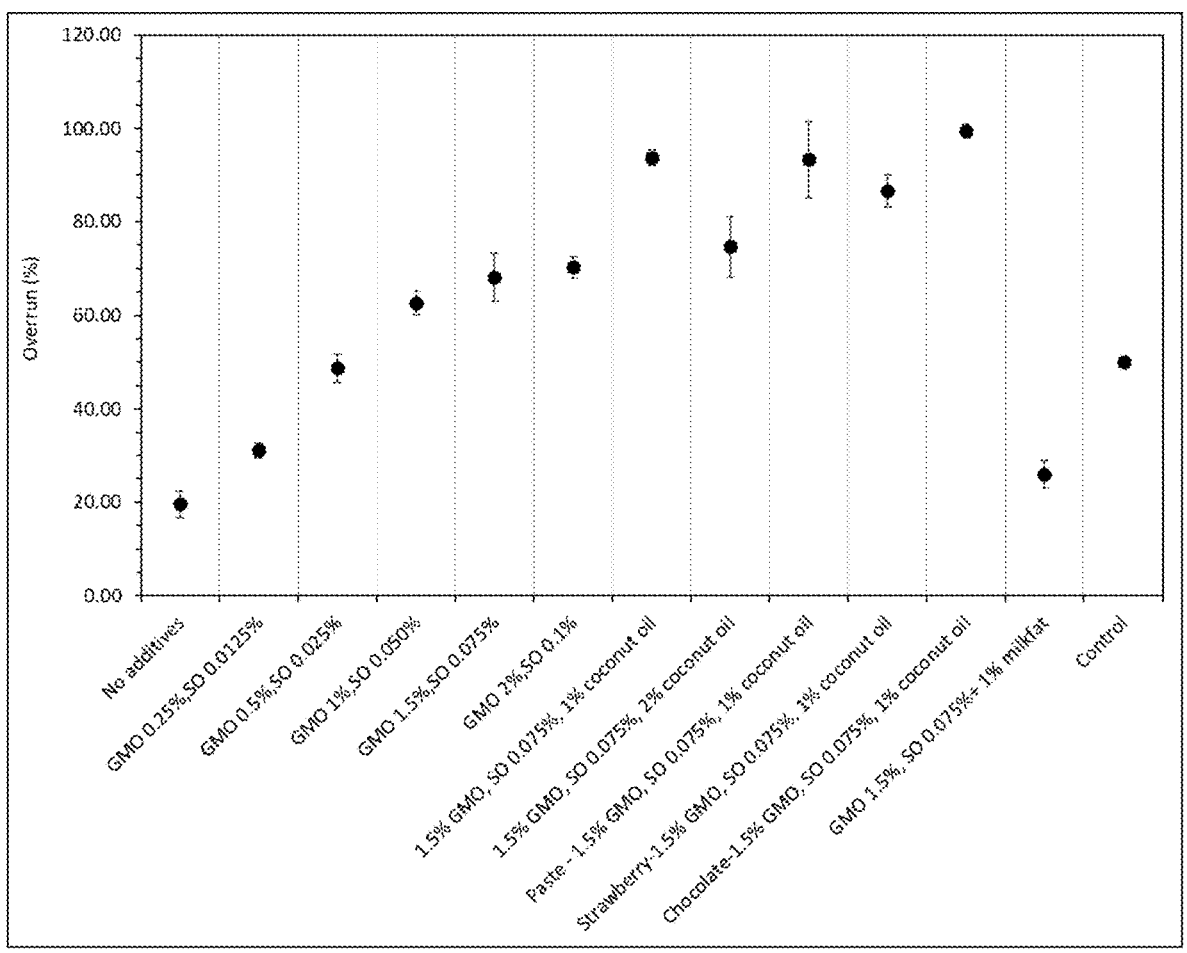
FIG. 1 graphically illustrates overrun (% v/v) for different frozen products comprising varying amounts of) sodium oleate (SO), as well as added coconut oil and milkfat.

A formulation that yields a structuring agent for use to prepare a food product is provided. The formulation comprises as ingredients, a monoglyceride and a fatty acid salt, wherein the ingredients are combined within a solvent to form a liquid crystalline lamellar phase above the Krafft temperature of the monoglyceride and the fatty acid salt, and a solid crystalline phase below the Krafft temperature of the monoglyceride.

The present formulation comprises a monoglyceride combined with a fatty acid salt which is structurally compatible with the monoglyceride. The fatty acid salt may comprise the fatty acid of the monoglyceride, herein referred to as 'the corresponding fatty acid salt" of the monoglyceride, or may comprise an unrelated fatty acid salt. In any case, the combination of the monoglyceride and the fatty acid salt are structurally compatible, so as to form a complex that is a liquid crystalline lamellar phase above the Krafft temperature of the monoglyceride. As known in the art, the "Krafft temperature" refers to the minimum temperature at which micelle formation occurs, and the temperature below which a surfactant exists in a solid crystalline form, often referred to as a "solid gel" phase in self-assembled lipidic structures. In one embodiment, structural compatibility results when the monoglyceride and the fatty acid salt have similar Krafft temperatures. In other words, the Krafft temperature of the monoglyceride (i.e. the first Krafft temperature) is within about 20° C. of the Krafft temperature of the fatty acid salt (i.e. the second Krafft temperature).

The liquid crystalline lamellar phase formed when the monoglyceride and the fatty acid salt are combined at a temperature above the Krafft temperature of the monoglyceride and the fatty acid salt is a stable complex and is evidence of the structural compatibility of the monoglyceride and fatty acid salt. The complex is useful as a structuring agent in foods. The term "liquid crystalline" refers to a state of matter having properties of both a conventional liquid and solid crystals, i.e. a liquid crystal is fluid like a liquid, but comprises molecules oriented one-dimensionally in a common direction as in a solid. The term "lamellar phase" refers to the ordered arrangement of polar-headed long chain nonpolar-tail molecules in an environment of bulk polar liquid, in other words, the monoglyceride and fatty acid salt in an aqueous phase.

Suitable monoglycerides for inclusion in the formulation will generally include long chain fatty acids, such as fatty acids comprising about 12-20 carbon atoms. Examples of such fatty acids include, but are not limited to, saturated fatty acids such as lauric acid, myristic acid, palmitic acid, stearic acid and arachidic acid; and unsaturated fatty acids such as lauroleic acid, myristoleic acid, palmitoleic acid, sapienic acid, oleic acid, elaidic acid, vaccenic acid, eicosenoic acid, linoleic acid and arachidonic acid. Thus, suitable monoglycerides include, but are not limited to glyceryl monolaurate, glyceryl monolauroleate, monomyristate, monomyristoleate, monopalmitate, monopalmitoleate, monostearate, monooleate, monolinoleate, monoarachidate and monoeicosenoate. In embodiments, monoglycerides having a melting point of less than 80° C. are preferred, such as less than 75° C., 65° C., 60° C., 55° C. or less than 50° C.

In one embodiment, a liquid crystalline lamellar phase is formed between a monoglyceride and a structurally compatible fatty acid salt, for example, between a monoglyceride and its corresponding fatty acid salt, e.g. between glyceryl monolaurate and a laurate salt, glyceryl monomyristate and a myristate salt, glyceryl monopalmitate and a palmitate salt, glyceryl monostearate and a stearate salt, glyceryl monooleate and an oleate salt, glyceryl monolinoleate and a linoleate salt, glyceryl monarachidate and an arachidate salt, monoeicosenate and an eiconsenoate salt. Alternatively, a liquid crystalline lamellar phase is formed between a monoglyceride and a structurally compatible fatty acid salt which is not a corresponding fatty acid salt but which exhibits structural similarity with the monoglyceride as evidenced by its Krafft temperature, e.g. having a Krafft temperature which is within about 20° C. of the Krafft temperature of the monoglyceride. Examples include, but are not limited to, the combination of glyceryl monooleate and a laurate salt, or the combination of glyceryl monolaurate and an oleate salt.

The fatty acid salt may be any salt acceptable for inclusion in foods. Examples include, but are not limited to, sodium, potassium, calcium and magnesium salts.

The monoglyceride and fatty acid salt are included in the formulation in an amount sufficient to yield a liquid crystalline lamellar phase at a temperature above the Krafft temperature of the monoglyceride, and a solid crystalline phase below the Krafft temperature of the monoglyceride. In an embodiment, the amount of monoglyceride in the formulation is about 0.1 to 5 wt %. In other embodiments, the amount of monoglyceride in the formulation is in the range of about 0.25-2 wt %. The ratio of the amount of monoglyceride to fatty acid salt in the formulation is 80-99 wt % monoglyceride to 1-20 wt % fatty acid salt. In embodiments, the amount of fatty acid salt in the formulation is 1-10 wt %, 2-8 wt %, 2.5-7.5 wt %, 3-7 wt %, 4-6 wt % or 5 wt % or 6 wt % of the amount of monoglyceride in the formulation.

The complex, i.e. liquid crystalline lamellar phase, is formed by heating the monoglyceride and fatty acid salt in an aqueous phase to a temperature above the Krafft temperature of the monoglyceride and the fatty acid salt with mixing for a period of time sufficient to form a translucent liquid crystalline lamellar phase. As used herein, "translucent" with respect to liquid crystalline colloidal solution is a solution having no visible particles therein, and which allows light, but not detailed shapes, to pass through, e.g. semi-transparent to light. The liquid crystalline phase is birefringent, i.e. exhibits double refraction of light, and may also display a blue or green hue depending on the observation angle. As one of skill in the art will appreciate, the aqueous phase may be initially heated followed by addition of the monoglyceride and fatty acid salt, either together or sequentially. In an embodiment, the monoglyceride is heated in the aqueous phase to the desired temperature to form a solution followed by addition of the fatty acid salt. In another embodiment, the monoglyceride is added to the heated solution of the fatty acid salt in the aqueous phase.

The formulation may optionally additionally comprise a fat. The fat is selected from saturated fats, unsaturated fats (either monounsaturated or polyunsaturated) or a mixture thereof. The fat component may be a vegetable fat or oil. Examples of suitable fats or oils include, but are not limited to sunflower oil, canola oil, safflower oil, soybean oil, avocado oil, olive oil, corn oil, flaxseed oil, almond oil, coconut oil, peanut oil, pecan oil, cottonseed oil, algal oil, palm oil, palm stearin, palm olein, palm kernel oil, rice bran oil, sesame oil, butteroil, cocoa butter, grape seed oil, hazelnut oil, brazil nut oil, linseed oil, acai palm oil, passion fruit oil, walnut oil, shea butter, shea stearin, shea olein, palm kernel stearin, palm kernel olein, and mixtures thereof. In embodiments, fats or oils comprising a higher saturated fatty acid content are utilized, for example, at least about 30 wt %, 40 wt %, 50 wt %, 60 wt %, 70 wt %, 80 wt % or more saturated fatty acid content. In one embodiment, fats or oils comprising at least about 50 wt % saturated fatty acid content, such as 50-95 wt % saturated fatty acid content are utilized. In other embodiments, fats or oils comprising less than 50 wt % unsaturated fatty acid content are utilized, for example, less than 40 wt %, 30 wt %, 20 wt % or 10 wt % saturated fatty acid content. In one embodiment, fats or oils comprising 5-30 wt % saturated fatty acid content are used in the formulation. The term "unsaturated fatty acid" encompasses mono-unsaturated and polyunsaturated fatty acids.

The fat may also be an animal fat or oil, including but not limited to, mammalian milk fat or butterfat, e.g. bovine, goat or sheep. The fatty acid content of milk fat is complex and varies with its source. Generally, milk fat comprises about 55-75 wt % saturated fatty acids, and less than 50 wt % unsaturated fatty acids. The major fatty acids in milk fat are straight chain fatty acids that are saturated and have 4 to 18 carbons (4:0, 6:0, 8:0, 10:0, 12:0, 14:0, 16:0, 18:0), mono-unsaturated fatty acids (16:1, 18:1), and polyunsaturated fatty acids (18:2, 18:3). Other animal fats may also be suitable for inclusion in the formulation including, but not limited to, rendered fat/oil.

Suitable vegan substitutes for milk fat include, but are not limited to, coconut oil, palm oil and its fractions, palm kernel oil, cocoa butter, shea and its fractions, yeast oils, microalgal oils, combinations thereof, in their native state or interesterified. Soy, almond, coconut, oat, rice, hazelnut, quinoa and potato milk may also be incorporated, optionally with an amount of a liquid oil, each generally comprising less fat content than milk fat.

In embodiments of the invention, the formulation may comprise a single fat, or may comprise combinations of fats, to achieve the desired structural and functional properties of the final product. For example, the formulation may include a saturated fat, an unsaturated fat or a combination of saturated and unsaturated fat. In embodiments, the combination of fats may comprise a cumulative content of at least about 50 wt % saturated fatty acids.

The fat is included in the formulation in an amount suitable to achieve desired structural and/or functional properties of the final product, and an amount that does not adversely affect the formation and functionality of the lamellar phase. The amount of fat in the formulation will generally depend on the selected fat(s) in the formulation. For example, fats which have a greater effect on viscosity of the formulation, i.e. which increase viscosity to a greater extent than other fats, will generally be incorporated in the formulation in lesser amounts so as not to adversely affect downstream processing of the product. Thus, an amount of fat in the formulation in the range of about 0-25 wt % may be used, depending on the fat(s) used, and the characteristics of the desired end product, preferably an amount in the range of 0-20 wt %. For a cream-based product, an amount of fat in the range of 10-25 wt % may be used. For other products, an amount of fat of less than 10 wt % may be used, e.g. up to about 6 wt %. In embodiments, coconut oil is incorporated in the formulation. Suitable amounts of coconut oil for incorporation in the formulation include amounts of up to about 3-4 wt %.

Additional (secondary) ingredients may be added to the formulation, and these will depend on the nature of the desired final product made using the formulation. Such secondary ingredients include ingredients and amounts of the ingredients that do not adversely affect the formation of the liquid crystalline lamellar phase by the selected monoglyceride and fatty acid salt. Stability-enhancing ingredients, sweetening agents, flavours, colorants, salt, antioxidants, preservatives, nutrients, fillers and the like are examples of additional ingredients that may be included in the formulation. Unless otherwise noted, the amounts of additional ingredients will be based on the desired product, physical characteristics, taste preferences and the like, and are generally based on amounts acceptable in the formulation arts.

Stability-enhancing ingredients, such as thickening or gelling agents, may be more widely utilized in the present formulation regardless of the final product, to enhance the stability of the formulation, and therefore, the final product. Examples of suitable thickening and/or gelling agents suitable for use in the present product include, but are not limited to, starches such as arrowroot, cornstarch, katakuri starch, potato starch, sago, tapioca and starch derivatives; modified or pre-gelatinized starches; flours made from raw grains, roots, beans, nuts or seeds, e.g. wheat, rye, corn, or almond flour, microbial and/or vegetable gums such as alginin, guar gum, locust bean gum, gellan gum, tara gum, Arabic gum, Konjac and xanthan gum; protein such as collagen, egg white, gelatin, protein concentrates and protein isolates such as pea protein; or polysaccharides (sugar polymers) such as agar, pectin, carrageenan (e.g. kappa, iota, lambda) and cellulose and derivatives thereof such as carboxymethyl cellulose; and mixtures thereof and cocoa powder. Such stability-enhancing ingredients may be included in an amount in the range of about 0.05-10 wt %. In embodiments, stability-enhancing ingredients are included in the formulation in an amount of about 0.5-4 wt %. In embodiments, vegetable gums are used to enhance stability of the product. In other embodiments, protein concentrates and/or isolates are used to enhance stability of the product. In other embodiments, a mixture of a gum and a protein concentrate/isolate are used to enhance stability of the product. A protein concentrate comprises about 40-75 wt % protein, while a protein isolate comprises greater than 75 wt % protein.

Non-limiting examples of sweetening agents include natural sweeteners such as, glucose, fructose, sucrose, dextrose, maltose, cane sugar, brown sugar, molasses, honey, maple syrup, corn syrup, high fructose corn syrup, erythritol, xylitol, sorbitol, isomalt, monatin, monellin, curculin, brazzein, tagatose and mannitol, and artificial sweeteners such as aspartame, acesulfame K, saccharin cyclamate and sucralose. Mixtures of sweeteners may also be used, including mixtures of natural and artificial sweeteners.

Non-limiting examples of flavouring and aroma agents include natural or artificial flavours such as fruit flavours (e.g. raspberry, orange, apple, pomegranate, mixed berry, lemon, lime, watermelon, strawberry, blueberry, pineapple, coconut, grape, cherry, banana, peach, mango, kiwifruit, cranberry), sodium sources (e.g. sodium chloride and monosodium glutamate), high fructose corn syrup, vanilla, chocolate, unsweetened chocolate, honey, molasses, brown sugar, coffee, cocoa, mint, maple, almond, or extracts or combinations thereof. Savoury flavourings may also be used (e.g. salt, pepper, herbs, and/or beef, chicken or vegetable flavourings).

Examples of preservatives that may be used include, but are not limited to, butylated hydroxytoluene, ethylenediaminetetraacetic acid, nitrates (e.g. sodium nitrate), sulfites (sodium bisulfite), benzoates (sodium benzoate), sorbates (e.g. sodium sorbate), propionate (sodium or calcium), ethyl formate, sulfur dioxide and sodium chloride.

Examples of anti-oxidants that may be used include, but are not limited to, citric acid monohydrate, vitamin A, vitamin C, folic acid, beta-carotene, propyl gallate, iron, copper, butylated hydroxyanisole, butylated hydroxytoluene, propyl gallate, tertiary butylhydroquinone, resveratrol, tocopherols, and plant phytonutrients or phytochemicals (e.g. flavonoids and lignin). Herbs or herbal extracts (e.g. oregano, Goji berry, dill, garden thyme, rosemary and peppermint), tea leaves or tea leaf extracts (e.g. *Camellia sinensis*), coffee bean extracts (e.g. *Coffea canephora* and *Coffea arabica*), brewed coffee or tea or brewed coffee or tea extracts (e.g. oolong tea and *Coffea robusta*) and other plants or plant extracts (e.g. ginger root) may also be used as a source of antioxidants, as well as combinations of any of the antioxidants.

Nutrients that may be included in the present product include vitamins (e.g. vitamin A, C, E, K, D, thiamin (vitamin B1), riboflavin (vitamin B2), niacin (vitamin B3), vitamin B6, folic acid (vitamin B9) and/or vitamin B12, and mixtures thereof), cobalamin, biotin, carotenoids (e.g. lutein, beta-carotene, lycopene and cryptoxanthin), choline, inositol, minerals (e.g. calcium, phosphorus, magnesium, sodium, potassium, chloride, iron, zinc, iodine, selenium, copper, chromium, molybdenum, manganese, fluoride, and mixtures thereof), and protein concentrates and/or isolates such as pea protein, soy protein, fava protein, yeast protein and other organisms, corn protein, wheat protein, rice protein, canola protein, peanut protein, bean protein, lentil protein, pumpkin seed, rice, brown rice, peanut, almond, chia seed, flax seed and combinations thereof. The protein source may be non-hydrolyzed, partially hydrolyzed or hydrolyzed and may be in the form of an intact protein, amino acid or peptide.

Colorants such as those which are suitable for inclusion in foods, e.g. FD&C blue #1, FD&C blue #2, FD&C citrus red #2, FD&C green #3, FD&C red #3, FD&C red #40, FD&C yellow #5 and FD&C yellow #6.

The balance of the formulation is solvent. The solvent may be an aqueous-based solvent. The preferred solvent is an aqueous solvent such as water, or other aqueous-based liquid such as a juice or broth. One or more of the secondary ingredients may be initially dissolved in the solvent prior to the combination of the monoglyceride and the fatty acid salt with the solvent. Alternatively, the monoglyceride and fatty acid salt may be combined initially with the solvent followed by addition of secondary ingredients, or all ingredients may be combined simultaneously with the solvent. The formulation comprises at least about 50 wt % of solvent, such as at least about 55 wt %, 60 wt %, 65 wt %, 70 wt %, 80 wt % or more solvent. Preferably the amount of the solvent, such as an aqueous phase, in the formulation is in the range of about 60-80 wt %.

In one embodiment, the formulation comprises a monoglyceride and fatty acid salt, such as GMO and SO, combined with a stability-enhancing ingredient and aqueous solvent. In another embodiment, the formulation comprises a monoglyceride and fatty acid salt, a stability-enhancing ingredient and a fat. In one embodiment, the stability-enhancing ingredients include gums, polysaccharide and/or protein in an amount of about 0.5-4 wt %, and the fat is a vegetable oil in an amount of up to about 6 wt %.

A method of making a food product using the structuring agent is also provided. The method comprises the steps of: i) combining and heating ingredients including a monoglyceride and a fatty acid salt as herein described, and optionally any other desired ingredients such as fats, stabilizing agents, sugars, flavours, colorants, antioxidants, preservatives, nutrients, and/or fillers with the solvent and heating to form a solution or mixture. The mixture is heated above the Krafft temperature of the monoglyceride and fatty acid salt for a period of time sufficient to form the liquid crystalline lamellar phase. As known in the art, the Krafft temperature to be used varies with the selected monoglyceride and fatty acid salt. For example, the Krafft temperature of glyceryl monooleate is about 15° C., while the Krafft temperature of glyceryl palmitate is about 54° C. Thus, the temperature required to form the liquid crystalline lamellar phase will vary based on the monoglyceride and fatty acid salt used. As set out above, the monoglyceride may be heated together with the fatty acid salt in the solvent together, or the monoglyceride or fatty acid salt may be initially heated in the solvent followed by addition and heating of the other. The optional ingredients may be added prior to, during or following heating. The optional ingredients may be added together or at different times.

The heating of the monoglyceride and fatty acid salt in the solvent to a temperature above their Krafft temperatures is conducted to form a mixed micelle. In one embodiment, the monoglyceride or fatty acid salt is heated at a temperature above their Krafft temperature to form micelles. The other of the monoglyceride or fatty acid salt is then added to the micelles at a temperature above its Krafft temperature to result in the formation of mixed micelles.

The mixture may optionally be pasteurized by heating to a temperature and for a time period suitable for pasteurization. The term "pasteurization" is used herein to refer to the application of heat to a product to eliminate microorganisms from within the product and thereby extend shelf-life. For example, the mixture may be pasteurized using a vat-type pasteurization, at a temperature in the range of about 62-68° C. for a period of at least 30 minutes. Alternatively, pasteurization may be achieved using higher temperatures for shorter periods of time, e.g. applying a temperature of up to 100° C. for a certain period of time. At temperatures close to 100° C., pasteurization may be achieved in a few seconds. Lower temperatures of 75-85° C. may be used to achieve pasteurization between 15-30 seconds. Pasteurization time and temperature is dictated by the ingredients in the mixture, nutritional and sensory qualities of the mixture, and the target pathogens and spoilage microorganisms. The nature of the mixture is also a consideration. More acidic mixtures require less stringent pasteurization conditions.

Following pasteurization, the mixture may optionally be homogenized. The term "homogenizing" as used herein has its conventional meaning and refers to the process of reducing and narrowing the particle size distribution of the components in the mixture, e.g. fat globules and protein aggregates, and interaction of the complex with other ingredients in the mixture.

The optionally homogenized mixture is cooled and may be allowed to age to achieve complete hydration of the ingredients, for example, the mixture may be aged for up to 24 hours at low temperature, for example, 5° C. Aging is also optional.

In order to produce a foam-based product, air is introduced into the mixture to form the foam-based product. This may be accomplished by whisking, whipping or beating, manually or with an automated mixer. This process of introducing air into the product or aerating expands the volume of dissolved gas in the product to form a colloid or foam-based product. Partially coalesced fat globules, if present, aid to create a stabilized network which function to trap air bubbles.

The foam-based product advantageously exhibits an overrun of at least about 30%. In one embodiment, the product exhibits an overrun of 30-110%. Preferably, the product exhibits an overrun of at least 40%, 50%, 60% or 70% or greater. The overrun is the volume increase within the product due to the incorporation of gas into the mixture.

The mixture may also be utilized without the introduction of air in a food product. The structuring agent, dispersed within the solvent, with or without the addition of fat, and optionally combined with one or more secondary ingredients, forms a structured cream-like product. Preferably, the mixture comprises a fat to provide a more stable structured product.

The present formulation and methods are useful to prepare edible foam-based and other products including, but not limited to, creams such as whipped creams or toppings, mayonnaise, yogurt, butters including nut butters, ice cream, sorbet, frozen dessert, foamy beverages including milk shakes and novelty drinks, cream cheese, margarine and other spreads, dips, frostings and toppings, dressings, vegetable and fruit purees, chocolate, ganache, candy, cake, whipped egg products such as quiche, meringue, soufflé, puddings and custards, fillings such as pie fillings, mousse, gravy, and the like.

The foam-based product may be made, as described above, by combining the monoglyceride and fatty acid salt (as powders) in a liquid medium, such as an aqueous solvent, and heated, followed by optionally pasteurizing and/or homogenizing, and whipping/aerating to yield a foam-based product. Alternatively, the monoglyceride and fatty acid salt may be combined with one or more additional ingredients as set out above, with heating, followed by optionally pasteurizing and/or homogenizing, and whipping/aerating to yield an intermediate foam-based product, which may be combined with one or more additional ingredients either prior to or subsequent to aerating, for example, by gently mixing and/or folding the additional ingredients into the intermediate product to yield a final foam-based product. For example, the intermediate foam-based product, such as a pudding or dip base, may be provided in unflavoured form to be combined with flavour or other additives just prior to consumption. Alternatively, the intermediate foam-based product may be combined with a selected liquid such as milk, fruit juice, a soft drink or alcohol, to make a foamy beverage. The intermediate foam-based product may also be combined with fruit or vegetable puree to provide a foamy side dish or soup, or combined with eggs to yield a quiche-like product or fluffy scrambled eggs.

In addition, once prepared, the intermediate or final foam-based product, comprising any additional ingredients, may be further processed by refrigeration, freezing, warming, baking, and/or setting prior to consumption. The intermediate or final foam-based product may be frozen or refrigerated for later use. Frozen or refrigerated foam-based products may be allowed to thaw or warm to room temperature, or be warmed above room temperature, prior to consumption.

In one embodiment, the foam-based product is used to make a frozen foam-based product, such as an ice cream or sorbet product. In this regard, the selected monoglyceride and fatty acid salt are combined with sugar(s), flavour, and other desired ingredients, heated to a temperature above the Krafft temperature of the monoglyceride and fatty acid salt, pasteurized and homogenized, not necessarily in that order, and then whipped as described (preferably at or below freezing temperature to incorporate air and create overrun), and then allowed to freeze at a temperature of about −30° C., followed by storage at a temperature of −18° C. or lower. The frozen foam-based product desirably exhibits an overrun of at least about 30%. In one embodiment, this product exhibits an overrun of between about 30-110%. In one embodiment, this foam-based product is refrigerated or kept frozen to retain the overrun for an extended period of time.

Additionally, the frozen foam-based product exhibits a suitable level of hardness based on penetration depth. The penetration depth of the frozen foam-based product is in the range of 10-110¹/₁₀ mm at −18° C., such as a penetration depth of at least about 20, 30, 40, 50, 60, 70, 80, 90 or 100¹/₁₀ mm at −18° C. Melt resistance is also an important property of a frozen foam-based product. The present frozen foam-based product exhibits a meltdown of no more than about 50 wt % in the first 30 minutes at 20° C., such as about 0.5 wt %, 5 wt %, 10 wt %, 20 wt %, 30 wt %, 40 wt % or 50 wt % in the first 30 minutes at 20° C.

In another aspect of the invention, a dry product is provided comprising the selected monoglyceride and fatty acid salt, both in powder form, for combination in a solvent to form a structuring agent for use in a desired foam-based product. The dry product may additionally comprise one or more secondary ingredients combined with the monoglyceride and fatty acid salt to form a particular foam-based product, including secondary ingredients such as stability-enhancing ingredients, sweetening agents, flavours, colorants, salt, antioxidants, preservatives, nutrients and/or fillers. The product is conveniently provided for admixture with a solvent, and optionally a fat or oil, to make a foam-based product as herein described.

The dry product may be provided in kit form in which one or more of the ingredients are separate from the other ingredients. For example, the secondary ingredients may be provided separated from the monoglyceride and fatty acid salt. The kit may also include a fat, separate from the other ingredients, for combination with the other ingredients. The kit may include instructions for combining the ingredients with a solvent, including directions with respect to application of heat, homogenization, aeration and storage. Such a kit may be useful for preparing foam-based food products as described herein.

In a further aspect of the invention, a gel concentrate for use as a structuring agent is provided, comprising a monoglyceride and a fatty acid salt complex in the form of a liquid crystalline lamellar phase, a solid crystalline lamellar phase, or a liquid crystalline cubic phase, as herein described, in a solvent, including an aqueous-based solvent or a polyol solvent, such as glycerol. The gel concentrate comprises 30-90 wt % of the monoglyceride+fatty acid salt mixture in 10-70 wt % solvent. A more concentrated gel can be prepared in a polyol solvent such as glycerol, e.g. up to concentrations of about 50-70 wt % of the monoglyceride+fatty acid salt mixture, while the gel prepared in an aqueous solvent achieves concentrations of the monoglyceride+fatty acid salt mixture in the range of about 10-40 wt %. As set out herein, the ratio of monoglyceride to fatty acid salt in the mixture is about 80-99 wt % monoglyceride to 1-20% wt fatty acid salt, preferably 90:10 (w/w), and more preferably 95:5 (w/w).

The gel concentrate may be combined with additional ingredients to make a foam-based product as previously described. The gel concentrate is combined with the additional ingredients in an amount in the range of about 0.1 to 5 wt %. In other embodiments, the amount of concentrate in the foam-based product is in the range of 0.25-2 wt %.

Embodiments of the invention are described by reference to the following non-limiting examples which are not to be construed as limiting.

Example 1—Frozen Foam-Based Product

The following methods were employed in the development and characterization of novel frozen foam-based products such as an ice cream.

Frozen dessert preparation method—The method of preparation of the mixes starts with the addition of sugar, glucose, gums, proteins, and/or emulsifiers to deionized water. Under continuous overhead mixing, the solution was heated gradually to above 30° C., and molten oil was then added and homogenized using a hand-held rotostator device (Ultra-Turrax, IKA Works Inc., Wilmington, DE, USA). The solution was then heated with continuous mixing to 75° C. and held at that temperature for 15 min for pasteurization, if being pasteurized. Upon pasteurization, the mix was homogenized with one pass through an APV SPX two-stage homogenizer (2000 psi followed by 500 psi). The pasteurized and homogenized mix was then collected and stored overnight in a fridge at 5° C. to allow for ageing of the mix. This allowed for proper hydration of the gums, proteins and emulsifiers, and also allowed for more complete crystallization of the fat used.

Ice cream crystallization step-Following the preparation of the mixture, crystallization was commenced by lowering the temperature of the mixture in the crystallizing machine (Soft Serve Ice Cream Machine, Taylor, Louisville, KY, USA, Image 1) to approximately −5° C. Subsequently, the partially crystallized mix underwent aeration for a minimum of 1 minute. The resulting crystallized and whipped frozen product was then stored at −30° C. overnight to complete the crystallization process. The following day, the prepared product was transferred to a −20° C. freezer for extended storage. Samples were obtained for analysis of melting profile and hardness using a cone penetrometer.

Characterization Methods

Overrun: The overrun refers to the percentage of volume increase in an aged frozen dessert mix immediately after whipping (to obtain weight of a given volume of the mix) and immediately after freezing in the batch freezer (to obtain the weight of the same volume of frozen dessert). A standard aluminium container of 227 mL volume was filled with either liquid ice cream mix or the prepared ice creams, and weighed. The overrun was calculated as Overrun (%)=[(wt. mix−wt. frozen dessert)/wt. frozen dessert]×100. Measurements were carried out in a walk-in fridge at 5° C. All measurements were done in duplicate.

Hardness at −18° C.: A penetrometer (Precision Penetrometer, Precision Scientific Company, Chicago, IL) was used to measure the hardness of frozen desserts at −18° C. Measurements were completed in the walk-in-freezer at −18° C. to ensure samples remained at the appropriate temperature throughout analyses. A hollow brass cone with a 30° stainless steel tip was adjusted so that the tip of the probe touched the surface of the frozen dessert. The probe was then allowed to penetrate the surface of the sample for 5 seconds under the force of gravity. All measurements were done in triplicate. It is important to realize that what is measured is the penetration depth, in units of 1/10 of a millimeter. The greater the penetration depth, the softer the ice cream and vice versa.

Meltdown Resistance—Frozen dessert samples (200 mL) at −18° C. were measured in duplicate for meltdown. The samples were removed from the storage container and weighed to determine an initial weight. The sample was then placed on a mesh grid over a funnel and allowed to sit at room temperature (~21° C. in the winter and ~28° C. in the summer). The melted sample passing through the mesh screen (2.5×2.5 mm) and funnel was collected and weighed every 30 minutes for a total time of 2 h. The percentage was calculated by dividing the weight of melted ice cream at each 30 min interval by the initial weight of ice cream and was then multiplied by 100. The average percentage meltdown for each sample was calculated and plotted against time in minutes. All measurements were carried out in triplicate.

Physical characteristics of commercial ice cream frozen dessert—Three different brands of ice cream were purchased at a local supermarket and analyzed for overrun, penetration depth (inverse of hardness) and meltdown. Results are shown in Table 1 below.

TABLE 1

Ingredients and characteristics of commercial ice cream frozen desserts

|  | PC cream first Ice Cream | Breyers Frozen Dessert | Haagen-Dazs Ice Cream |
|---|---|---|---|
|  | Sugars | Modified milk ingredients | Cream |
|  | Skim milk powder | Water | Concentrated skim milk |
|  | Vanilla extract | Sugar | Sugar |
|  | MAGs and DAGs | Coconut oil | Liquid egg yolk |
|  | Cellulose gum | Vanilla flavour | Vanilla extract |
|  | Guar gum | MAGs and DAGs |  |
|  | Polysorbate 80 | Tara gum |  |
|  | Carrageenan | Guar gum |  |
|  | Ground vanilla | Carob bean gum |  |
|  |  | Annato |  |
|  |  | Turmeric extract |  |
| Overrun (% v/v) | 58 ± 4.9 | 43.0 ± 2.8 | 28.1 |
| Penetration depth (1/10 mm) at −18° C. | 86 ± 7.1 | 105 ± 6.0 | 15.3 ± 0.52 |
| Meltdown at 30 mins (wt %) at room temperature | 32 ± 4.2 | 24 ± 9.2 | 18.3 ± 0.08 |

The Haagen-Dazs brand has a characteristic high hardness. The high hardness is due to its greater density (less air content or less overrun). As can be appreciated, the low overrun is correlated to a higher hardness, or lower cone penetration depth. The meltdown of the ice cream is also lower. Of note is that overrun and hardness are not necessarily strictly correlated since Breyers frozen dessert has a lower overrun than PC Cream First, but is softer (greater penetration depth). There are other ingredients that come into play.

Example 2. The Role of Ingredients in the Formulation

In this example, vegan frozen products, e.g. an ice cream, were prepared as described in Example 1. The contents of the products were varied containing fat (coconut oil), soy protein and guar gum, to no fat with protein and gum, to fat and protein with no gum, to fat and gum with no protein, to fat with no gum or protein. Other components were maintained in the composition including sugars, glucose, MAGs/DAGS, salt and water. The results are shown in Table 2.

TABLE 2

Composition and physical characteristics of frozen products with and without fat

|  | No gum, no protein | Protein, no gum | Gum, no protein | Gum, protein, fat | Gum, protein, no fat |
|---|---|---|---|---|---|
|  | Sugars 13.3% | Sugars 13.3% | Sugars 13.3% | Sugars 13.3% | Sugars 13.3% |
|  | Glucose 10.6% | Glucose 10.6% | Glucose 10.6% | Glucose 10.6% | Glucose 10.6% |
|  | Coconut oil 9.69% | Coconut oil 9.69% | Coconut oil 9.69% | Coconut oil 9.69% | Coconut oil 0% |
|  | MAGs and DAGs 0.12% | MAGs and DAGs 0.12% | MAGs and DAGs 0.12% | MAGs and DAGs 0.12% | MAGs and DAGs 0.12% |
|  | Sunflower oil 0.31% | Sunflower oil 0.31% | Sunflower oil 0.31% | Sunflower oil 0.31% | Sunflower oil 0.31% |
|  | Guar gum 0.0% | Guar gum 0.0% | Guar gum 0.25% | Guar gum 0.25% | Guar gum 0.25% |
|  | Salt 0.05% | Salt 0.05% | Salt 0.05% | Salt 0.05% | Salt 0.05% |
|  | Soy protein 0% | Soy protein 1.11% | Soy protein 0% | Soy protein 1.11% | Soy protein 1.11% |
|  | Water 65.83% | Water 64.82% | Water 65.68% | Water 64.57% | Water 74.26% |
| Overrun (%) | 0 | 31.0 ± 3.0 | 31.4 ± 5.0 | 42.4 ± 3.0 | 41.0 ± 5.0 |
| Penetration depth (1/10 mm) | 0 | 50 ± 2.4 | 14.3 ± 1.2 | 42.0 ± 2.0 | 31.0 ± 4.0 |

| | Meltdown (% w/w) | | | | |
|---|---|---|---|---|---|
| Time elapsed (minutes) | Meltdown (%) | Meltdown (%) | Meltdown (%) | Meltdown (%) | Meltdown (%) |
| 30 | 100 | 2.5 ± 0.6 | 10.8 ± 2.2 | 3.0 ± 1.3 | 4.0 ± 0.0 |
| 60 | 100 | 25.9 ± 1.0 | 36.6 ± 2.3 | 36.1 ± 2.3 | 40.5 ± 0.7 |
| 90 | 100 | 52.2 ± 0.1 | 75.2 ± 3.3 | 65.5 ± 1.6 | 72.0 ± 0.0 |
| 120 | 100 | 72.8 ± 0.2 | 95.5 ± 2.0 | 90.9 ± 0.02 | 96.0 ± 0.00 |

When soy protein and guar gum were omitted from the formula, shown in column 1 of Table 2, there was no overrun and the ice cream completely melted after only 30 min at room temperature. When soy protein was added, shown in column 2, an overrun of 31% (v/v) was achieved, the hardness is decreased with a cone penetration depth of 50 1/10 mm at −18° C., and meltdown was reduced with only 2.5 wt % of the original weight lost after 30 min at room temperature. When only guar gum was added to the formula, shown in column 3, but no soy protein, an overrun of 31% (v/v) was achieved as with soy protein only, but the hardness was much greater, with only 14 1/10 mm of cone penetration at −18° C. The meltdown also increased to 10.8 wt % after 30 min at room temperature. Thus, gums appear to provide similar overrun to soy protein, but increased both hardness and meltdown as compared to soy protein. Interestingly, when guar gum and soy protein were added together to the formula, a 42.4% (v/v) overrun, a penetration depth of 42 1/10 mm at −18° C., and a meltdown of only 3 wt % were achieved after 30 min at room temperature (column 4). This suggests a synergistic interaction between guar gum and soy protein, leading to higher overrun, but comparable hardness and meltdown to soy protein alone. Overrun and hardness were within the range of commercial samples, but meltdown was much lower than the commercial samples (Example 1). Interestingly, when the fat was removed from the formula, but guar gum and soy protein were retained (column 5), the overrun remained similar at 41% (v/v), hardness decreased somewhat, with a penetration depth of 31 1/10 mm, and meltdown remained low, at 4 wt %. It would seem that coconut fat is not providing much structural or functional advantage to the frozen dessert formulation over and above the effects provided by the guar gum and soy protein.

The results confirm that soy protein and guar gum help to stabilize the volume expansion of an ice cream mix upon whipping and freezing, while coconut fat does not enhance overrun. It does, however, decrease the final hardness of the frozen dessert, making it softer and more desirable. Soy protein helps slow down the meltdown of the frozen dessert more than the guar gum. However, both the protein and gum exhibit a meltdown prevention effect. Soy protein is more effective than guar gum in creating a soft ice cream.

Example 3. Fat-Free and Low Fat Frozen Product Prepared with GMO+SO

In this set of experiments, different amounts of glyceryl monooleate (GMO) and its corresponding fatty acid salt, sodium oleate (SO) (both in powder form), were added to a base formula (at a constant ratio of 19:1 w/w) including sugars, xanthan gum, water and vanilla (Table 3). With a constant 1.5 wt % GMO and 0.075 wt % SO content, fats were separately added to the formulation including 1 wt % milkfat, and coconut oil (1 wt % and 2 wt %) as shown in Table 4. The GMO+SO was added as powder or a glycerin-based paste to a 1 wt % coconut oil formulation (Table 5). Different flavour options were also explored with the coconut oil (1 wt %) formulation, including strawberry and chocolate-flavored frozen desserts (Table 6). A high fat control formulation was prepared comprising 1.5 wt % GMO and 0.075 wt % SO and about 10 wt % fat (coconut and sunflower oils) as in Table 7.

TABLE 3

Frozen product with varying amounts (wt %) of GMO and SO

| Ingredients | GMO 2% SO 0.1% (wt %) | GMO 1.5%, SO 0.075% (wt %) | GMO 1% SO 0.05% (wt %) | GMO 0.5% SO 0.025% (wt %) | GMO 0.25% SO 0.0125% (wt %) | No GMO/SO additives (wt %) |
|---|---|---|---|---|---|---|
| sugar | 13.30 | 13.30 | 13.30 | 13.30 | 13.30 | 13.30 |
| glucose | 7.30 | 7.30 | 7.30 | 7.30 | 7.30 | 7.30 |
| dextrose | 5.62 | 5.62 | 5.62 | 5.62 | 5.62 | 5.62 |
| xanthan gum | 0.10 | 0.10 | 0.10 | 0.10 | 0.10 | 0.10 |
| GMO | 2.00 | 1.50 | 1.00 | 0.50 | 0.25 | 0.00 |

TABLE 3-continued

Frozen product with varying amounts (wt %) of GMO and SO

| Ingredients | GMO 2% SO 0.1% (wt %) | GMO 1.5%, SO 0.075% (wt %) | GMO 1% SO 0.05% (wt %) | GMO 0.5% SO 0.025% (wt %) | GMO 0.25% SO 0.0125% (wt %) | No GMO/SO additives (wt %) |
|---|---|---|---|---|---|---|
| SO | 0.10 | 0.075 | 0.05 | 0.025 | 0.0125 | 0.00 |
| vanilla | 1.70 | 1.70 | 1.70 | 1.70 | 1.70 | 1.70 |
| water | 69.88 | 70.41 | 70.93 | 71.46 | 71.72 | 71.98 |

TABLE 4

Frozen product with GMO + SO and fats

| Ingredients | Coconut oil 1% (wt %) | Coconut oil 2% (wt %) | Milk fat 1% (wt %) |
|---|---|---|---|
| sugar | 13.3 | 13.3 | 13.3 |
| glucose | 7.3 | 7.3 | 7.3 |
| dextrose | 5.62 | 5.62 | 5.62 |
| xanthan gum | 0.1 | 0.1 | 0.1 |
| GMO | 1.5 | 1.5 | 1.5 |
| SO | 0.075 | 0.075 | 0.075 |
| vanilla | 1.7 | 1.7 | 1.7 |
| Coconut oil | 1 | 2 | 0 |
| Milkfat | | | 1 |
| water | 69.41 | 68.41 | 69.41 |

TABLE 5

Frozen product made with GMO + SO paste

| Ingredients | Paste (wt %) | Mix (wt %) |
|---|---|---|
| sugar | | 13.30 |
| glucose | | 7.30 |
| dextrose | | 5.62 |
| xanthan gum | | 0.10 |
| GMO | 1.50 | |
| SO | 0.08 | |
| vanilla | | 1.70 |
| coconut oil | | 1.00 |
| water | 3.43 | 65.98 |
| paste | | 5.00 |

TABLE 6

Flavoured frozen product with GMO + SO and 1 wt % fat

| Ingredients | Strawberry (wt %) | Chocolate (wt %) |
|---|---|---|
| sugar | 13.3 | 13.3 |
| glucose | 4.6 | 4.6 |
| dextrose | 6 | 6 |
| guar gum | 0.25 | 0 |
| GMO | 1.5 | 1.5 |
| SO | 0.075 | 0.075 |
| coconut oil | 1 | 1 |
| cocoa power | 0 | 2 |
| flavor | 0.2 | 0.2 |
| red color | 0.2 | 0 |
| water | 72.875 | 71.075 |

TABLE 7

Composition of a vegan high fat control product

| Ingredients | Composition (wt %) |
|---|---|
| sugar | 13.30 |
| glucose | 4.60 |
| dextrose | 6.00 |
| guar gum | 0.24 |
| GMO | 1.5 |
| SO | 0.075 |
| coconut oil | 9.69 |
| sunflower oil | 0.31 |
| salt | 0.05 |
| mono & diglycerides | 0.12 |
| soy protein | 1.11 |
| water | 64.58 |

Results

FIG. 1 illustrates the overrun (v/v %) of the various formulations determined as described above. As shown, increasing the content of GMO from 0.25 wt % to 1.5 wt %, with a proportionate increase in SO to maintain a 1:19 w/w ratio, increases the overrun of the frozen dessert to about 70% (v/v). This trend appears to plateau at about 70% (v/v) overrun as 2 wt % GMO also exhibits about 70% (v/v) overrun. Surprisingly, addition of 1% coconut oil to the formulation comprising 1.5 wt % GMO+0.075 wt % SO increased the overrun further to close to about 100% (v/v). The same result was obtained for GMO and SO when added as powders to the formulation or when added as a glycerin-rich paste. Another unexpected result is the fact that the observed increase in overrun for the 1.5 wt % GMO+0.075 wt % SO sample with 1 wt % coconut oil was not observed for 1 wt % milkfat. For milkfat, the overrun only reached 26% (v/v). The control, 10 wt % coconut fat+sunflower oil sample had an overrun of 50% (v/v), similar to that of commercial frozen desserts in Example 1.

Figure 2:
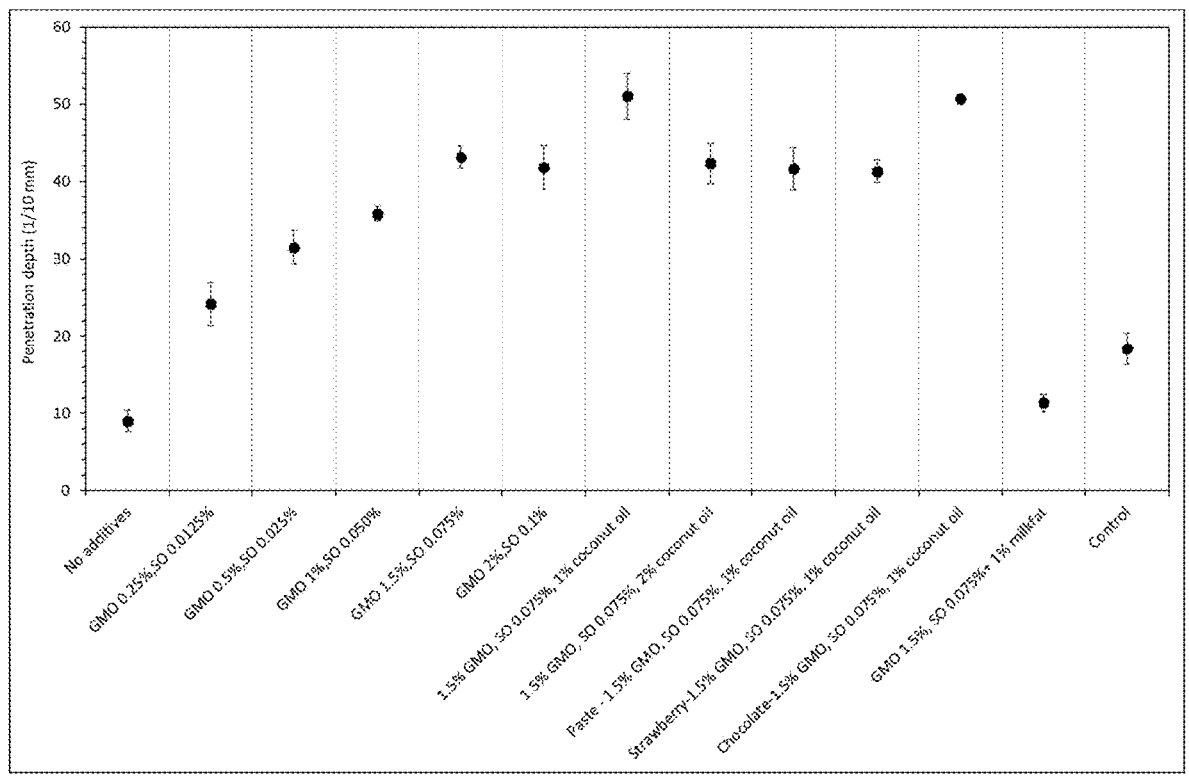
FIG. 2 graphically illustrates penetration depth (1/10 mm) at −18° C. of the frozen products of FIG. 1.

Increasing the content of GMO from 0.25 wt % to 1.5 wt %, with a proportionate increase in SO to maintain a 1:19 w/w ratio, increases the penetration depth (decreases the hardness) of the frozen dessert to 43¹⁄₁₀ mm as shown in FIG. 2. Again, penetration depth appears to plateau as 1.5 wt % and 2 wt % exhibit similar penetration depths. Surprisingly, addition of 1 wt % coconut oil to the mix containing 1.5 wt % GMO increased the penetration depth further to 51¹⁄₁₀ mm. Upon addition of 2 wt % coconut oil, the penetration depth decreased (hardness increased) to 42¹⁄₁₀ mm. When the GMO+SO were added as a paste at 1.5 wt % GMO content with 1 wt % coconut oil, the penetration depth was similar to the 2% coconut oil version at a penetration of about 42¹⁄₁₀ mm. Interestingly, addition of cocoa powder to form the chocolate formulation softened the frozen dessert to a penetration depth of 51¹⁄₁₀ mm, similar to that of the 1% coconut oil version. The 1.5 wt % GMO+0.075 wt % SO sample with 1 wt % milkfat was very hard, with a penetration depth of only 11.3¹⁄₁₀ mm, mirroring the no additive formulation and its lower overrun as compared to the other formulations. The vegan frozen dessert control, 10 wt % coconut fat+sunflower oil sample, was relatively hard as well, with a penetration depth of 18.3 1/10 mm.

Figure 3:
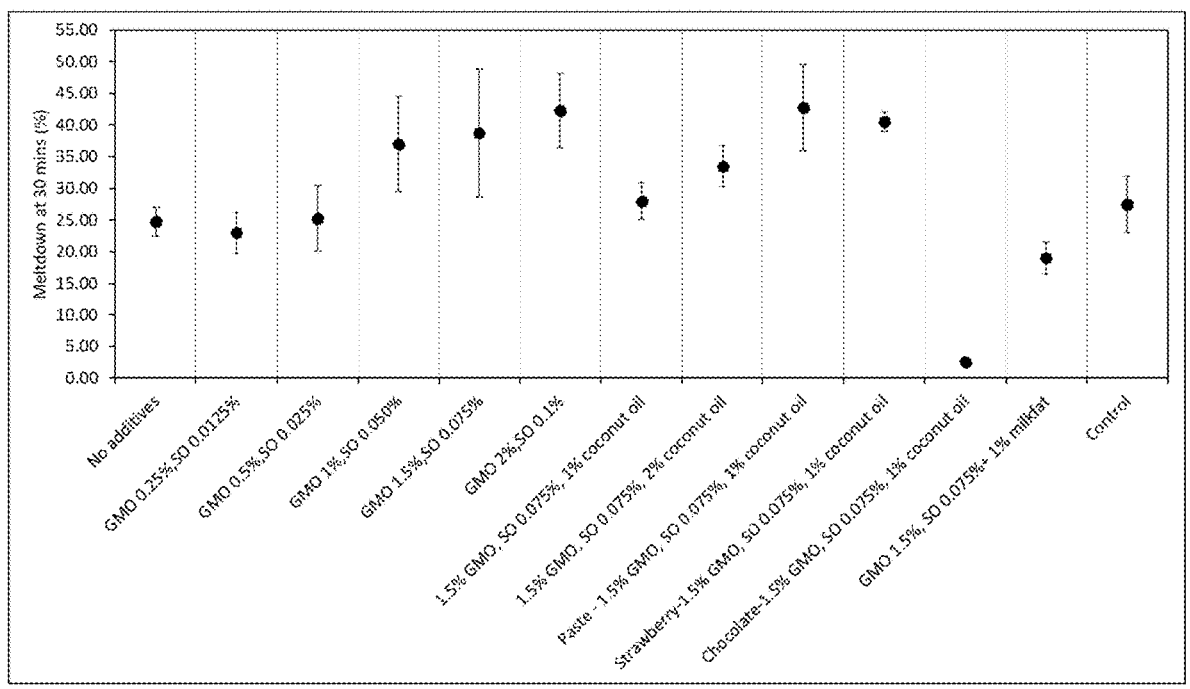
FIG. 3 graphically illustrates meltdown (wt %) of the frozen products of FIG. 1 after 30 min in a temperature-controlled cabinet at 22° C.

Increasing the content of GMO+SO from 0.25 wt % to 2 wt % GMO generally increased the meltdown of the frozen dessert to about 42 wt % when GMO was 2 wt %, although the meltdown did appear to plateau at 1-2 wt % GMO as the 1 wt % GMO and 1.5 wt % GMO formulations exhibited a similar % meltdown (FIG. 3). Surprisingly, the addition of fat decreased the meltdown. The addition of 1 wt % coconut oil to the mix containing 1.5 wt % GMO+0.075 wt % SO decreased the meltdown, to 28 wt %, while the addition of 2 wt % coconut oil resulted in a meltdown of about 32 wt %. When the GMO and SO were added as a glycerin-rich paste at a 1.5 wt % GMO+0.075 wt % SO content with 1 wt % coconut oil, the meltdown increased to 42 wt % which was higher than its non-paste counterpart. Interestingly, while the strawberry flavoured formulation had a similar meltdown to the GMO+SO paste formulation, addition of cocoa powder to form the chocolate formulation drastically decreased meltdown to 2.5 wt %. This was probably due to the natural polysaccharides and protein present in the cocoa powder. The 1.5 wt % GMO+0.075 wt % SO formula with 1 wt % milkfat also had a low meltdown of about 19 wt %. The control, 10 wt % coconut fat+sunflower oil, sample had a meltdown of 27.5 wt % after 30 minutes at room temperature.

These results highlight the ability of GMO+SO to increase the overrun of vegan frozen desserts, while also decreasing their hardness. A limitation of the technology seems to be the increase in meltdown upon inclusion of the GMO+SO. This will be addressed in an example below. Of note is the remarkable effect of cocoa powder in the chocolate formulation containing 1.5% GMO+0.075 wt % SO and 1 wt % coconut oil. This was the formula with the highest overrun, the greatest penetration (softness) and the lowest meltdown.

Figure 4:
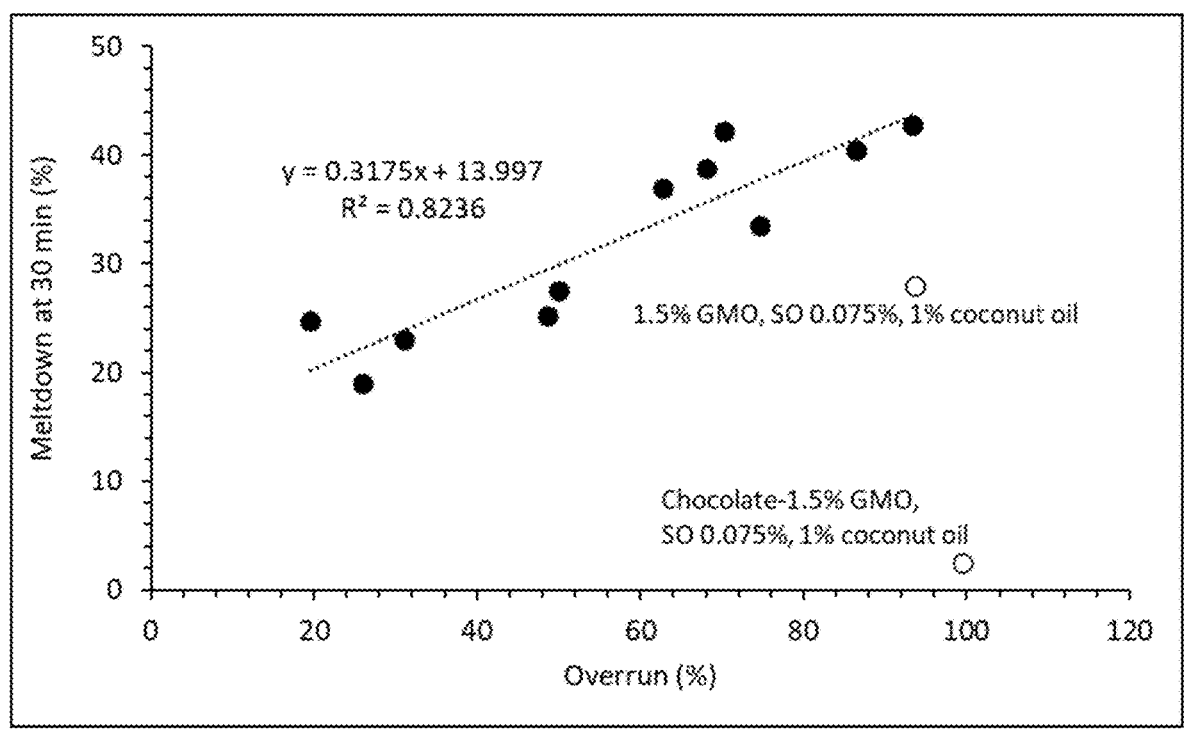
FIG. 4 graphically illustrates the linear correlation between overrun and meltdown of the frozen products of FIG. 1.

In this study, it was discovered that the greater the overrun, the greater the melt, as shown in FIG. 4, and the greater the penetration depth (softness). This result makes sense since the higher the air content of the frozen foam, the thinner the watery lamellae between the bubbles and the faster their meltdown. Increasing the viscosity and thickness of these lamellae could, in principle, improve/decrease the meltdown. It is possible that 0.1 wt % xanthan gum is not enough to increase lamellar viscosity, increase lamellar thickness and decrease meltdown. It is also possible that xanthan gum is not the best polysaccharide gum to decrease meltdown. Notable outliers to these trends include the cocoa-containing formulation are the chocolate recipe containing 1.5 wt % GMO+0.075 wt % SO with 1 wt % coconut oil and cocoa powder, and 1.5 wt % GMO+0.075 wt % SO with 1 wt % coconut oil. The coconut oil adds some extra meltdown resistance to the frozen dessert, but cocoa powder addition decreases the meltdown drastically compared to any other treatment.

Example 4. Low-Fat and Fat-Free Formulations Prepared with GMO+SO Water-Based Paste Fat-free and low fat formulations prepared with a paste composed of 33.3 wt % glyceryl monooleate:sodium oleate (GMO:SO, 19:1 w/w), 33.3 wt % water and 33.3 wt % glycerin were used to prepare a vegan frozen dessert. Formulations are shown in Table 8 below.

TABLE 8

| | Low-fat and fat-free formulation made with GMO + SO water-based paste | | | | | |
|---|---|---|---|---|---|---|
| | Composition without coconut oil (wt %) | | | Composition with coconut oil (wt %) | | |
| Ingredients | 1% GMO + SO | 1.25% GMO + SO | 1.5% GMO + SO | 1% GMO + SO | 1.25% GMO + SO | 1.5% GMO + SO |
| sugar | 13.3 | 13.3 | 13.3 | 13.3 | 13.3 | 13.3 |
| glucose | 7.3 | 7.3 | 7.3 | 7.3 | 7.3 | 7.3 |
| dextrose | 5.62 | 5.62 | 5.62 | 5.62 | 5.62 | 5.62 |
| xanthan gum | 0.1 | 0.1 | 0.1 | 0.1 | 0.1 | 0.1 |
| vanilla | 1.7 | 1.7 | 1.7 | 1.7 | 1.7 | 1.7 |
| coconut oil | 0 | 0 | 0 | 1.00 | 1.00 | 1.00 |
| gel | 2.85 | 3.56 | 4.28 | 2.85 | 3.56 | 4.28 |
| water | 69.13 | 68.42 | 67.71 | 68.13 | 67.42 | 66.71 |
| GMO | 1 | 1.25 | 1.5 | 1 | 1.25 | 1.5 |
| SO | 0.05 | 0.0625 | 0.075 | 0.05 | 0.0625 | 0.075 |
| glycerin | 0.9 | 1.125 | 1.35 | 0.9 | 1.125 | 1.35 |
| water | 0.9 | 1.125 | 1.35 | 0.9 | 1.125 | 1.35 |

Figure 5:
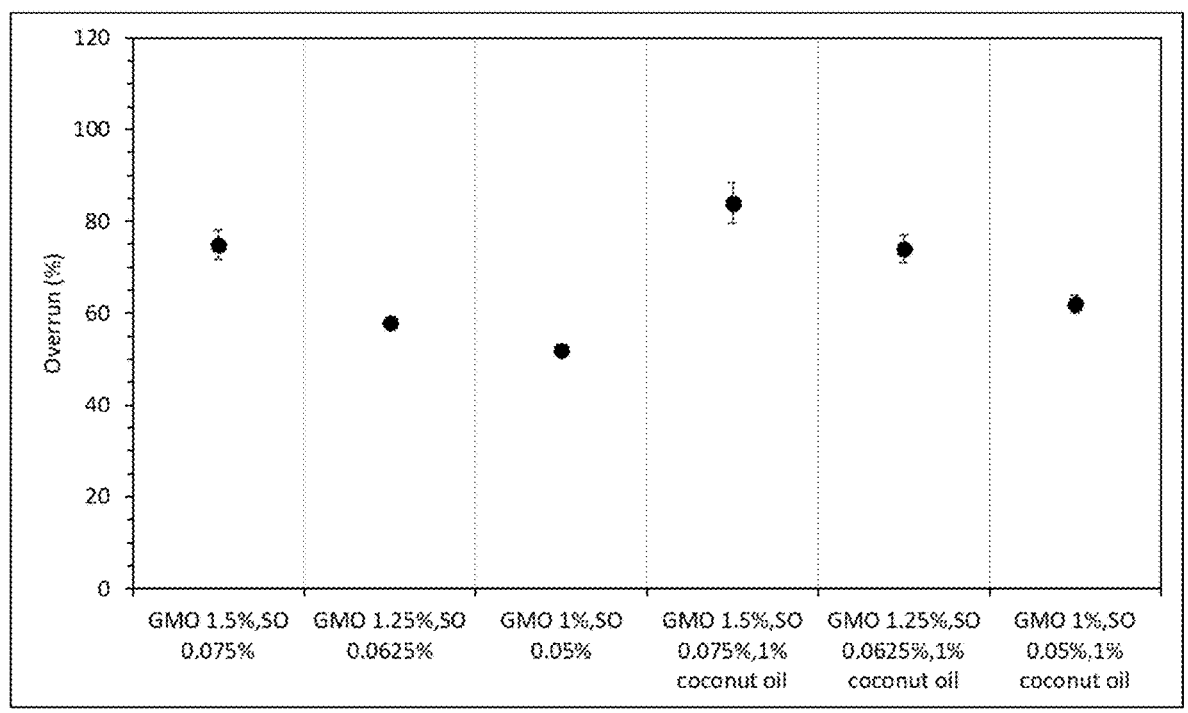
FIG. 5 graphically illustrates overrun (% v/v) for frozen products comprising different amounts of the monoglyceride+fatty acid salt (GMO:SO) glycerin gel, with or without added 1 wt % coconut oil.
Figure 6:
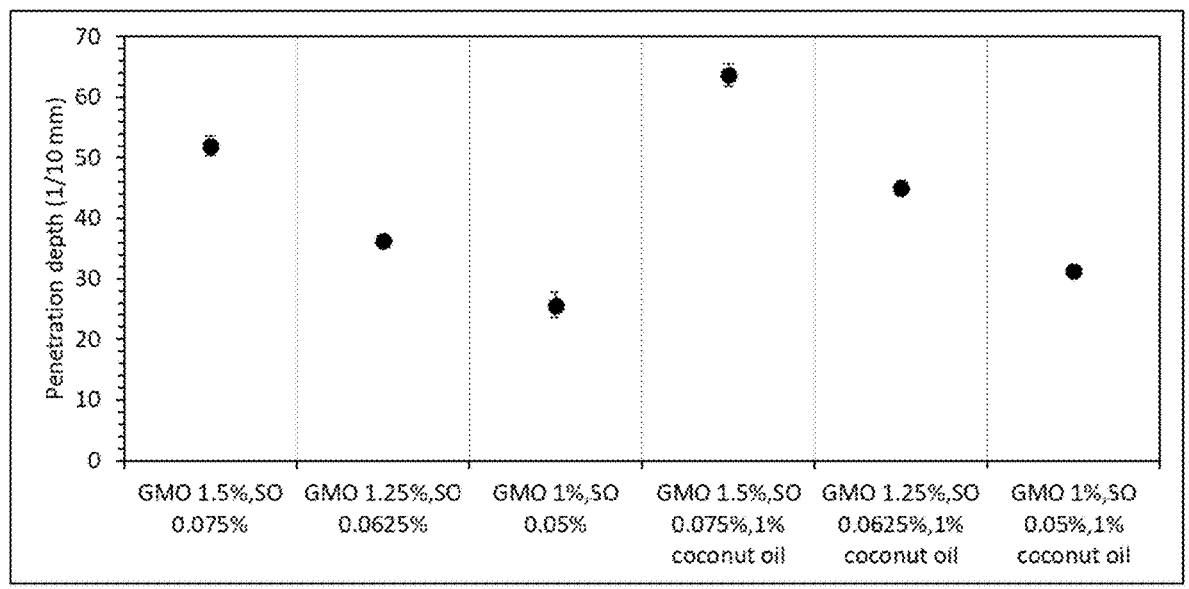
FIG. 6 graphically illustrates penetration depth (1/10 mm) at −18° C. for the frozen products of FIG. 5.
Figure 7:
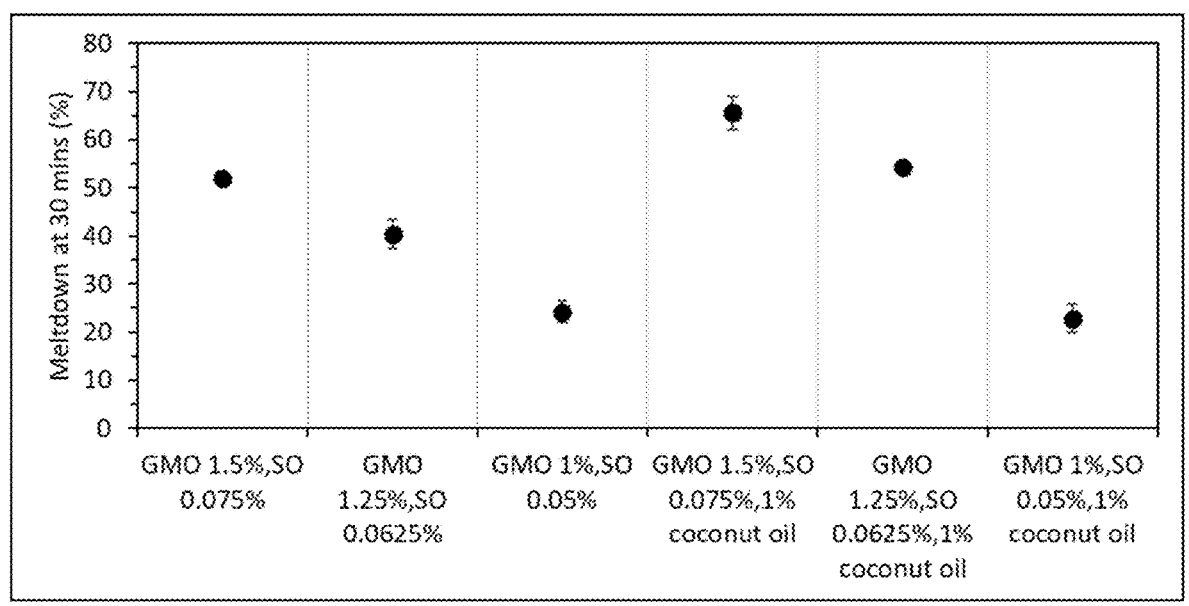
FIG. 7 graphically illustrates meltdown after 30 min (wt %) for the frozen products of FIG. 5 in at room temperature a 22° C. temperature-controlled cabinet.

As shown in Example 3, the greater the amount of GMO+SO paste added, the greater the overrun (FIG. 5), the greater penetration depth (lower the hardness, FIG. 6), and the greater the meltdown (FIG. 7). The conclusion from this study is that GMO and SO can be successfully added to a frozen dessert mix in a paste format, rather than dry powders, and still exhibit similar effects of increasing overrun and softness upon freezing and whipping.

Example 5. Formulation with GMO and SO with Different Gums

Formulations with gum arabic and guar gum instead of xanthan gum were used to make a frozen foam-based dessert to explore effect on meltdown. The formulations used are shown in Table 10. A high-fat control formulation comprising gum arabic, 10 wt % and no GMO+SO as shown in Table 11.

TABLE 10

| Formulations with guar gum and gum arabic | |
|---|---|
| Ingredients | Composition (wt %) |
| sugar | 13.30 |
| glucose | 4.60 |
| dextrose | 6.00 |
| gum arabic/guar gum | 0.24 |
| coconut/canola oil | 1.00 |
| GMO | 1.50 |

TABLE 10-continued

Formulations with guar gum and gum arabic

| Ingredients | Composition (wt %) |
|---|---|
| SO | 0.075 |
| salt | 0.05 |
| water | 73.24 |

TABLE 11

High-fat control formulation

| Ingredients | Composition (wt %) |
|---|---|
| sugar | 13.30 |
| glucose | 4.60 |
| dextrose | 6.00 |
| gum arabic | 0.24 |
| coconut oil | 9.69 |
| sunflower oil | 0.31 |
| salt | 0.05 |
| MAGs and DAGs | 0.12 |
| Soy protein | 1.11 |
| water | 64.58 |

Figure 8:
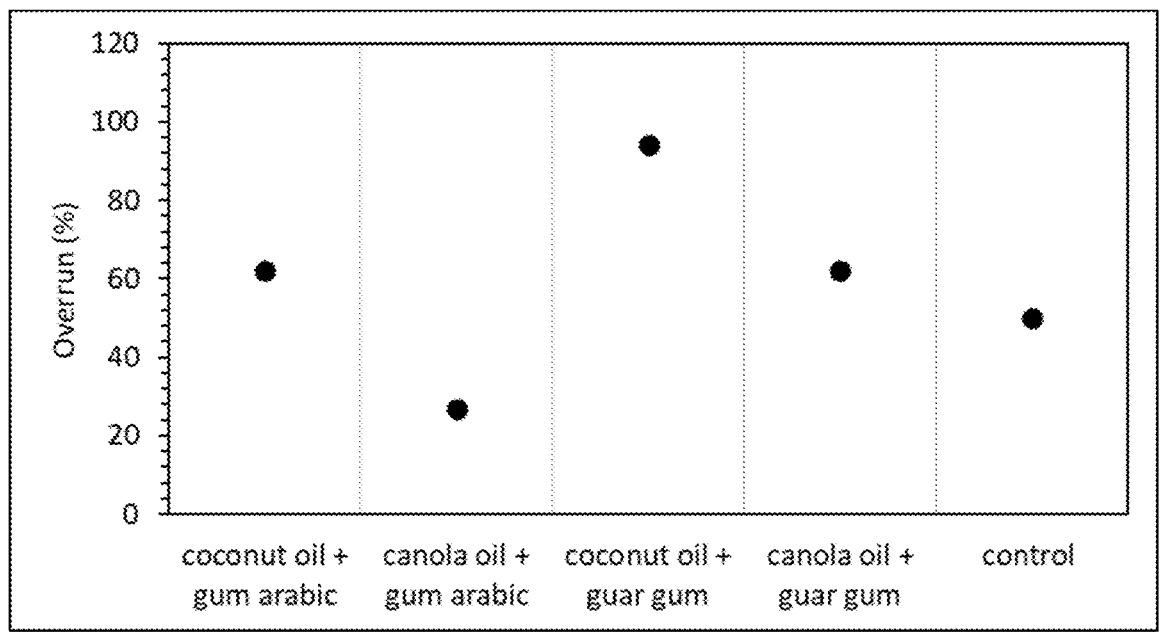
FIG. 8 graphically illustrates overrun (% v/v) for frozen products comprising 1.5 wt % GMO+SO and 1 wt % coconut oil or 1 wt % canola oil, with 0.24 wt % guar gum or gum arabic.

The high fat control frozen dessert was determined to have an overrun of 50% (v/v). Both of the guar gum formulations (comprising 1 wt % canola oil or 1 wt % coconut oil) yielded frozen desserts with higher overruns than the control (FIG. 8), while for the gum arabic samples, only the 1 wt % coconut oil sample had a higher overrun. Interestingly, use of a hard fat like coconut oil resulted in a higher overrun than a liquid oil, like canola oil.

Figure 9:
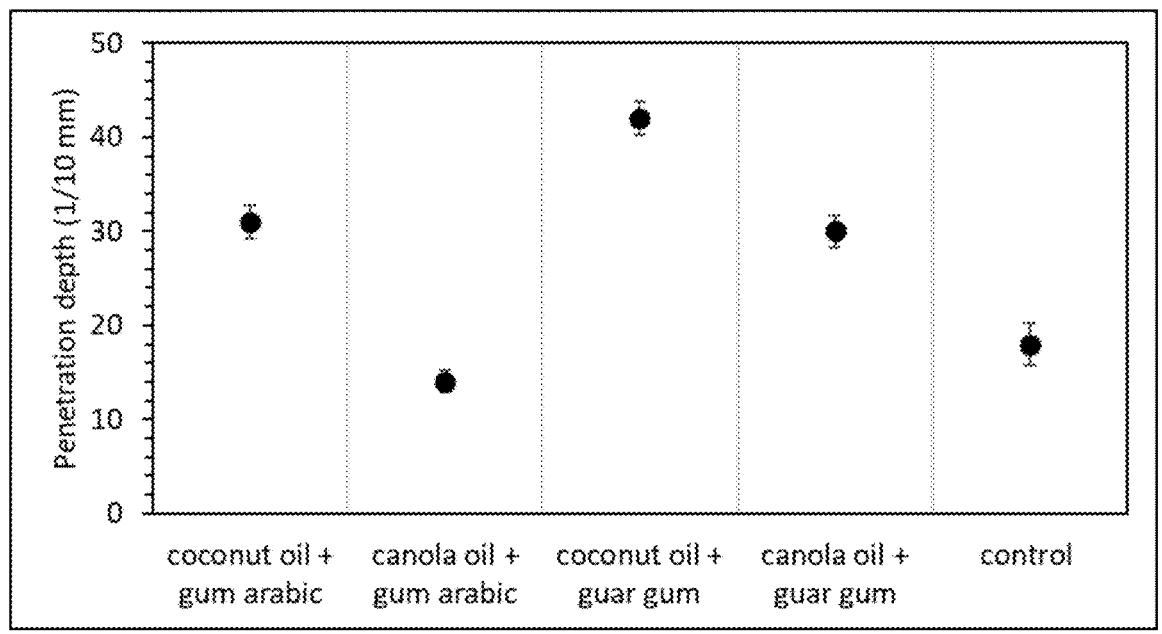
FIG. 9 graphically illustrates penetration depth (1/10 mm) at −18° C. for the frozen products of FIG. 8.

Mirroring the trend shown for overrun, the high fat control frozen dessert had a penetration depth of about 18 1/10 mm. Both of the guar gum formulations (comprising 1 wt % canola oil or 1 wt % coconut oil) yielded frozen desserts with higher overruns than the control (FIG. 9), while for the gum arabic samples, only the 1 wtw % coconut oil sample had a greater penetration depth. Interestingly, a hard fat like coconut oil always showed a greater penetration depth than a liquid oil, like canola oil.

Figure 10:
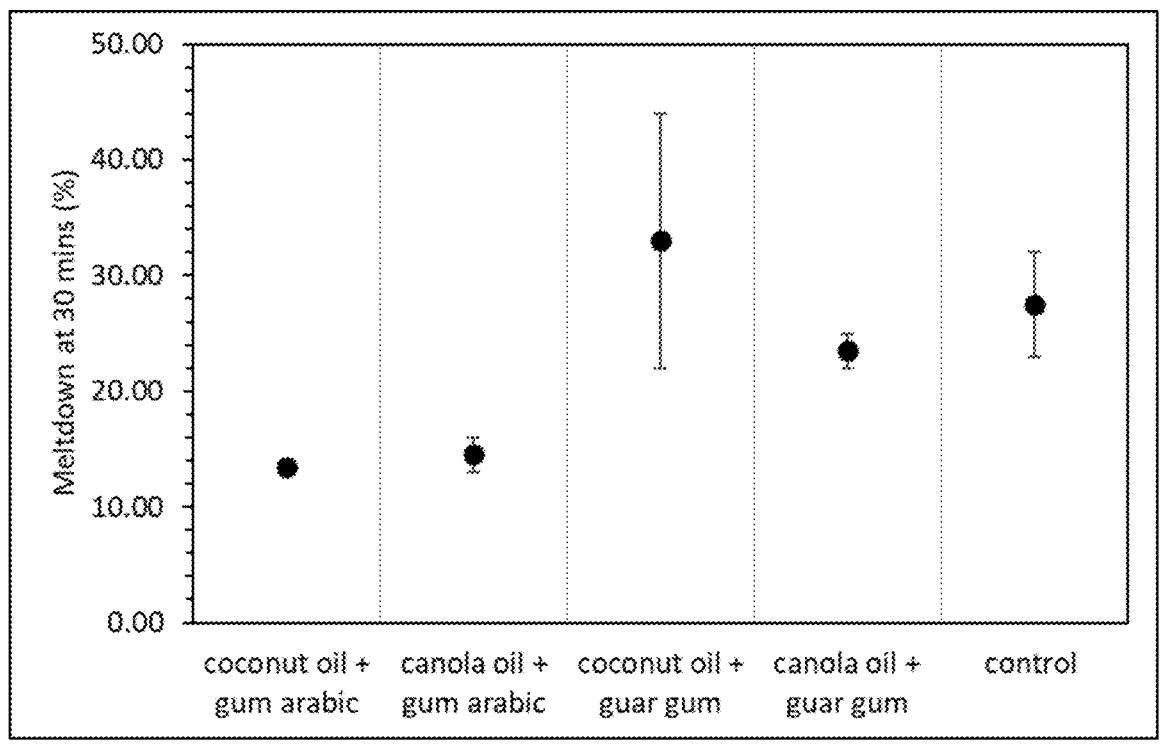
FIG. 10 graphically illustrates meltdown (wt %) for the frozen products of FIG. 8 in a 22° C. temperature-controlled cabinet.
Figure 11:
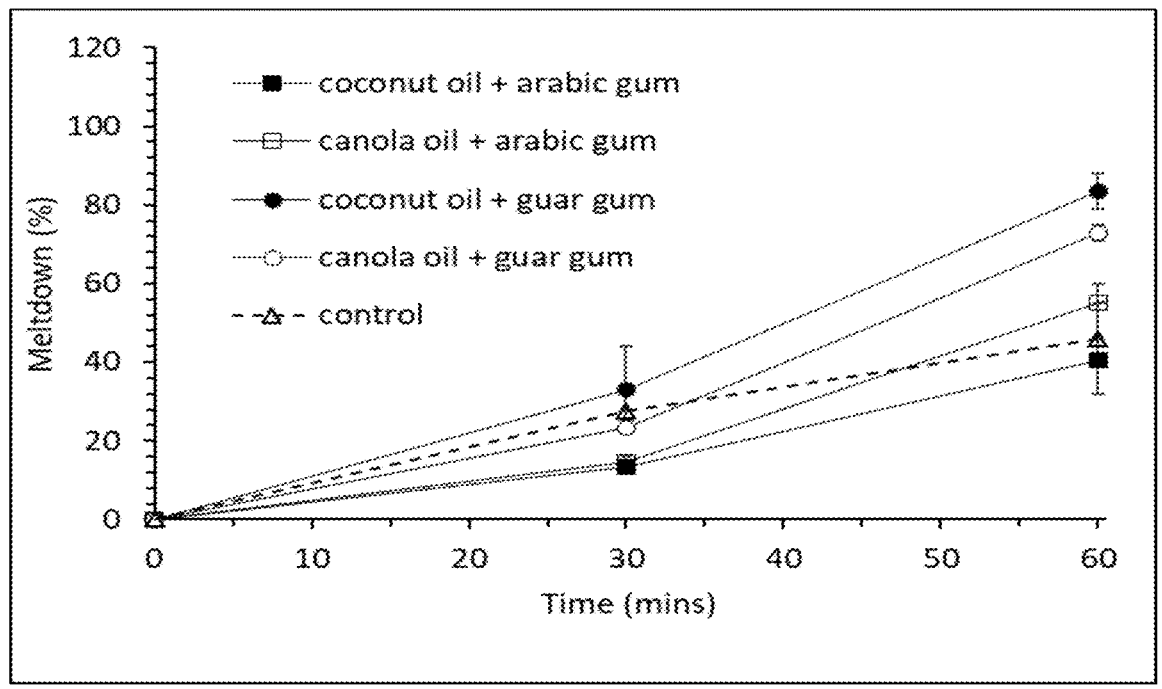
FIG. 11 graphically illustrates meltdown (wt %) profiles at room temperature for the frozen products of FIG. 8 in a 22° C. temperature-controlled cabinet.

Regarding meltdown, interestingly, the gum arabic samples exhibited the least meltdown after 30 min at room temperature, ~15 wt %, while the guar gum samples exhibited, on average, a similar meltdown to the high fat control of ~28 wt %. These results are shown in FIG. 10, and were maintained up to 1 hour of melting (FIG. 11).

These results indicate that gum arabic in more effective than guar gum in slowing meltdown, but that guar gum is superior in terms of increased overrun and softness.

Example 6. Formulations with GMO+SO with Removal of Other Ingredients

In this example, the use of the GMO+SO+glycerin paste to decrease the coconut fat content of ice cream to 1 wt %, remove the MAGs and DAGs emulsfiers, and remove soy protein was explored.

Formulations comprising GMO+SO+glycerin paste with sugars, coconut oil and no MAGs or DAGs, and with pea protein or guar gum as shown in Table 12 were used to make a foam-based frozen dessert.

TABLE 12

GMO + SO formulations with pea protein or guar gum

| Ingredients | | FORMULA Composition (wt %) | | |
|---|---|---|---|---|
| | | GMOS + O_1 PPC | GMO + SO_0.5 PPC | GMO + SO GUAR |
| Sugar | | 13 | 13 | 13 |
| Glucose | | 13 | 13 | 13 |
| gum guar | | 0 | 0 | 0.25 |
| Coconut oil | | 1 | 1 | 1 |
| GMO | | 1 | 0.50 | 1 |
| SO | | 0.05 | 0.025 | 0.05 |
| MAGs + DAGs | | 0 | 0 | 0 |
| Pea protein concentrate | | 2 | 2 | 0 |
| Vanilla | | 0.10 | 0.10 | 0.10 |
| water | | 68.870 | 69.887 | 70.625 |
| Glycerol | | 0.975 | 0.479 | 0.975 |
| Overrun (% v/v) | Average | 54.40 | 44.95 | 38.30 |
| | STDEV | 1.13 | 1.20 | 0.42 |
| Penetration depth at −18° C. (1/10 mm) | Average | 84.70 | 27.50 | 41.50 |
| | STDEV | 7.76 | 3.73 | 6.35 |
| Meltdown (wt %) Time (min) | | | | |
| 30 | Average | 5.67 | 1.30 | 4.27 |
| | STDEV | 0.36 | 0.14 | 0.67 |
| 60 | Average | 39.41 | 29.74 | 32.72 |
| | STDEV | 1.24 | 2.45 | 0.72 |
| 90 | Average | 79.77 | 58.43 | 59.50 |
| | STDEV | 0.77 | 5.31 | 1.92 |
| 120 | Average | 95.18 | 77.25 | 80.76 |
| | STDEV | 0.72 | 7.50 | 2.67 |

Formulations comprising 1.5 wt % GMO+0.05 wt % SO (GMO+SO_1) in combination with 2 wt % of pea protein concentrate (PPC) yielded a frozen dessert with an overrun of 54% (v/v), a penetration depth of 84.7 1/10 mm and meltdown of only 5.6 wt % after 30 minutes (GMO+SO_1 PPC). Reduction of the amount of GMO to 0.5 wt % resulted in a decrease in overrun (to about 45% v/v), an increase in hardness, and a decrease in meltdown (GMO+SO_0.5 PPC). When the pea protein was replaced with 0.25 wt % guar gum (GMO+SO_1 GUAR), the result was an even lower overrun of about 38% (v/v), an average penetration depth of 42 1/10 mm and a meltdown of 4.3 wt % in 30 minutes. These results show that the formulation with the pea protein concentrate, no guar gum and 1 wt % GMO+0.05 wt % SO performed the better than the other formulations.

Example 7. Formulations with GMP+SP

The use of another lamellar monoglyceride and fatty acid soap formulation, glyceryl monopamitate (GMP) and sodium palmitate (SP) was investigated at the same ratio of 19:1 (w/w), the ingredients of which are set out in Table 13.

TABLE 13

Formulation with glyceryl monopalmitate and sodium palmitate

| Ingredients | Composition (wt %) |
|---|---|
| sugar | 13 |
| glucose | 13 |
| gum guar | 0 |
| coconut oil | 1 |
| GMP | 1 |
| SP | 0.05 |

TABLE 13-continued

| Formulation with glyceryl monopalmitate and sodium palmitate | | |
|---|---|---|
| MAGs + DAGS | | 0 |
| pea protein concentrate | | 2 |
| vanilla | | 0 |
| water | | 69.95 |
| glycerin | | 0 |
| Results | | |
| Overrun (% v/v) | Average | 42.95 |
|  | Standard Deviation | 0.92 |
| Penetration depth at −18° C. (1/10 mm) | Average | 22.50 |
|  | Standard Deviation | 1.37 |
| Meltdown (wt %) | | |
| 30 min | Average/Standard Deviation | 3.71/1.15 |
| 60 min | Average/Standard Deviation | 35.64/1.00 |
| 90 min | Average/Standard Deviation | 69.98/2.13 |
| 120 min | Average/Standard Deviation | 97.65/0.03 |

Addition of 1 wt % GMP+0.05 wt % SP and 2 wt % pea protein concentrate resulted in a frozen dessert with 43% (v/v) overrun, a penetration depth of 22.5¹/₁₀ mm and a meltdown of 3.7 wt %. Thus, this combination also provided a suitable foam-based dessert, with somewhat less overrun and penetration depth (harder) than the sample using the GMO+SO combination. Thus, other combinations of monoglyceride and corresponding salt are suitable for use as structuring agents in foam-based products.

Example 8. Structuring and Creating Overrun in Frozen Fruit Purees

The use of a GMO+SO gel to create overrun and structure in frozen fruit purees was explored. Frozen purees are often offered as desserts in old-age homes, as an alternative to high fat and sugar ice cream. Frozen fruit puree is not as appealing as ice cream and when frozen as they turn into a block of flavored ice, which defeats the purpose of eating an indulgent dessert. If the creaminess of the puree could be increased by increasing air incorporation, the appeal of a frozen puree would increase and provide a healthy alternative to ice cream with a lower fat and sugar content.

Single-strength fruit purees were prepared by homogenizing fruits in a home food processor with added water and addition of 2 wt % of a 66 wt % GMO+SO-glycerin gel (66.6 wt % concentration of 19:1 w/w GMO:SO in glycerol). The purees made and concentrations in water (w/v) were:

Apple Puree 50%
Strawberry Puree 27%
Pear Pure 23%

The GMO+SO gel in glycerin (66.6 wt % concentration of 19:1 w/w GMO:SO) was added to the fruit purees at 2 wt % levels and heated to 40° C. After 20 min of mixing at 40° C., the gel dissolved and was incorporated. The gel did not dissolve immediately and required some time to fully disperse/dissolve and to become incorporated. The mixture was then aerated by mixing in the blender for 20 min until 20% overrun was achieved. The mixture was then deposited as drops onto a pan. These drops showed a very good texture and appearance. When frozen, the drops retained overrun.

This example demonstrates that the GMO:SO complex creates structure and provides desirable texture to frozen fruit purees, and can be used to create appealing desserts.

Example 9. Viscosity of the Formulations and Maximum Fat Content

The viscosity of the present formulations was determined at 5° C. using an MCR302 rheometer (Anton Paar, Graz, Austria). A constant shear rate of 50 s$^{-1}$ was used for all measurements, using a cone-and-plate geometry. The cone had a diameter of 20 mm and an offset from parallel angle of 2°. The gap was set to 0.5 mm.

The formulations comprised fixed amounts of 66.6 wt % GMO+SO (66.6 wt % concentration of 19:1 w/w GMO:SO) in glycerol paste, pea protein, sugars and guar gum, with different amounts of coconut oil added from 0% to 10 wt % in 2 wt % increments. The compositions of the mixes (wt %) are listed in Table 14 below:

TABLE 14

| Formulations (wt %) used to determine the effect of fat content on viscosity and gelation | | | | | | |
|---|---|---|---|---|---|---|
| Coconut oil | 0 | 2 | 4 | 6 | 8 | 10 |
| Sugar | 13.3 | 13.3 | 13.3 | 13.3 | 13.3 | 13.3 |
| Glucose | 10.6 | 10.6 | 10.6 | 10.6 | 10.6 | 10.6 |
| Pea Protein Concentrate | 2 | 2 | 2 | 2 | 2 | 2 |
| GMO-SO-glycerin paste | 2 | 2 | 2 | 2 | 2 | 2 |
| Guar Gum | 0.25 | 0.25 | 0.25 | 0.25 | 0.25 | 0.25 |
| Water | 71.85 | 69.85 | 67.85 | 65.85 | 63.85 | 61.85 |

The method of preparation of the mixture starts with the addition of sugar, glucose, pea protein concentrate, guar gum and the 66 wt % GMO+SO-glycerin gel to deionized water. Under continuous overhead mixing, the solution was heated gradually to 40° C., and molten coconut oil was then added. The solution was heated with continuous mixing to 75° C., homogenized using a hand-held rotostator device (Ultra-Turrax, IKA Works Inc., Wilmington, DE, USA) and held at 75° C. for 15 min for pasteurization. Following pasteurization, the mixture was homogenized with one pass through an APV SPX two-stage homogenizer (2000 psi followed by 500 psi). The pasteurized and homogenized mix was then collected and stored overnight in a fridge at 5° C. to allow for ageing of the mixture. This allows for hydration of the gum, pea protein concentrate and the paste, also allowing for crystallization of the coconut oil. The viscosity of the mixes was then determined.

Figure 12:
FIG. 12 illustrates the sol-gel state transition for food product formulations comprising 1.5% GMO+0.075 wt % SO delivered as a high glycerol content gel as a function of coconut oil content, from 0 wt % to 10 wt % in 2 wt % increases from left to right.

FIG. 12 illustrates changes in the consistency of the mixtures with increasing fat content, from 0% fat (far left), to 10 wt % fat (far right), in 2 wt % increments. Samples containing 0, 2 and 4 wt % coconut oil are liquid, while samples containing 6, 8 and 10 wt % coconut oil are solid gels, which do not flow when inverted. This demonstrates the structuring power of the GMO+SO combination and the fact that it interacts with the dispersed fat (coconut oil) to create a gel that provides structure to the mix.

The changes in consistency resulting from the combination of GMO+SO with different fat levels may be used to make different products. For example, GMO+SO combined with fat levels of less than 6% may be used in liquid products such as such as foam-based beverages and/or frozen products such as ice cream or other frozen products, while GMO+SO combined with higher fat levels, e.g. greater than 6% may be used in products which require greater structure (such as semi-solid or solid products), e.g. cream cheese, cottage cheese, soft-cheese like products, yoghurt mimetics, creams, puddings, mousse, spreads, mayonnaise, sauces and the like.

Figure 13:
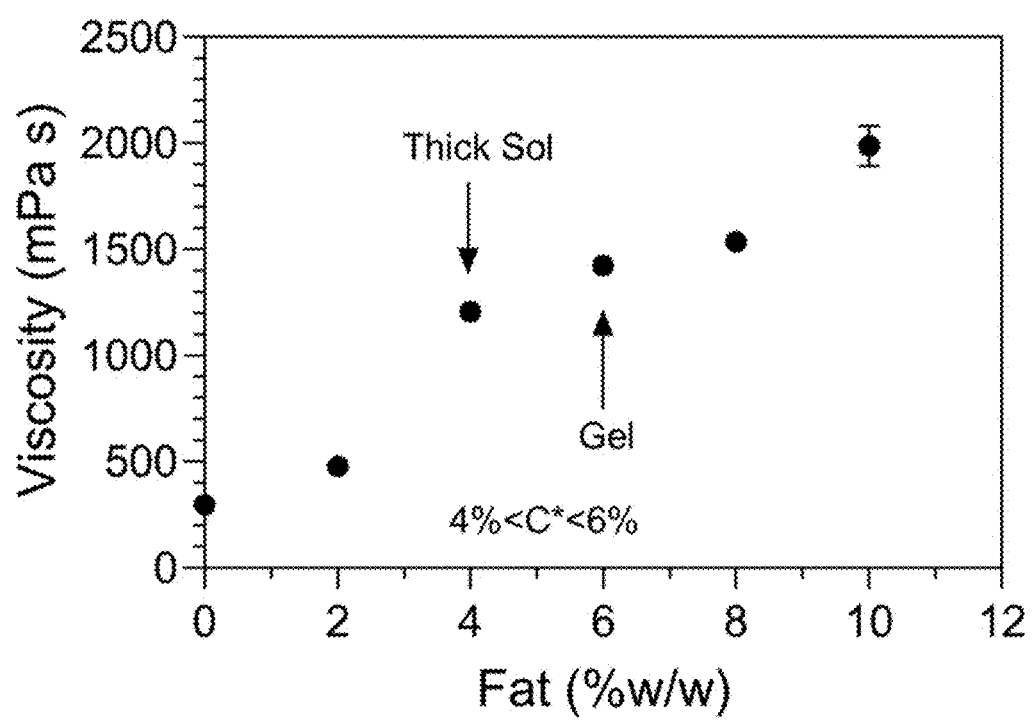
FIG. 13 graphically illustrates the viscosity of frozen food products comprising 1.5% GMO+0.075 wt % SO glycerol gel as a function of coconut oil content.

Results from viscosity measurements are shown in FIG. 13. As can be seen, there is a large increase in viscosity between 2 wt % and 4 wt % coconut oil (fat), and then gelling observed above that range (at ~1500 mPa s). It is estimated that the critical concentration for gelation of the formulations at 5° C. is between about ~ 5-6 wt % fat.

Example 10. Structural Characterization of the Monoglyceride-Fatty Acid GMO+SO Combination The structure resulting from the combination of the GMO+SO was determined to understand its effect on overrun, penetration depth, hardness and meltdown in products comprising the combination. For this purpose, powder X-ray diffraction (XRD), synchrotron small-angle X-ray scattering (sSAXS), differential scanning calorimetry (DSC), surface tension measurements, compression isotherms, and conductivity measurements were used. X-ray diffraction/scattering, both small-angle X-ray scattering (SAXS), and wide-angle X-ray scattering (WAXS) provide fingerprints of the nanoscale structure and solid state structure of crystals and liquid crystals. DSC is used to determine the melting or glass transition temperature and enthalpy of materials. Surface tension provides a measure of the surface activity of materials which is required for foam stabilization. Compression isotherms provide a measure of the rigidity of an interfacial film required for foam stabilization. The conductivities of solutions of GMO and SO alone, in contrast to GMO and SO together indicate possible interactions between GMO and SO.

Powder X-ray diffraction (XRD)—Powder X-ray diffraction analysis was performed using a MiniFlex powder X-ray diffractometer (MiniFlex 600, Rigaku Corp.; Tokyo, Japan). Samples were crystallized at 22° C. A copper X-ray tube (Cu K$\alpha$1$\lambda$=1.54 Å) was used as the X-ray source. Spectra were acquired at 23° C. in the 2θ 2-30° diffraction angle region at 5°/min. The operating voltage and amperage for the MiniFlex 600 unit were 40 KV and 15 mA, respectively. This machine has a theta-2 theta goniometer and works in reflection mode.

Differential scanning calorimetry (DSC)—To determine the melting points of the samples, a TA DSC analyzer model Q2000 (TA instruments, Mississauga, ON, Canada) with a cooling system was utilized. Nitrogen was used to purge the system at a flow rate of 18 mL/min. Ten to twenty milligrams of each sample was placed in an aluminum DSC pan with a lid. Measurements were taken against a reference empty hermetically sealed pan. The pan was equilibrated at 20° C., before the temperature ramped up at 5° C./min to 90° C.

Synchrotron Small-Angle X-ray Scattering (sSAXS)—sSAXS experiments were carried out at the Canadian Light Source (CLS) synchrotron on the Brockhouse X-ray Diffraction and Scattering sector Wiggler Lower Energy Beamline (BXDS-WLE) (Leontowich et al., Journal of Synchrotron Radiation, 28 (2021) 961-969). Samples were smeared on one side of Scotch tape and attached to the sample holder. SAXS patterns were collected with a Rayonix MX300 detector with 2×2 binning (4096×4096 pixel) for an effective pixel size of 73.242 μm. SAXS patterns were collected with a wavelength of 1.25916 angstrom and sample-to-detector distance of 2325 mm. SAXS patterns were collected in transmission geometry with 5, 15 or 30 second dwell time at ambient temperature. Patterns were processed with GSASII (Argonne National Laboratory (C), 2010). This product includes software developed by the UChicago Argonne, LLC) (Von Dreele, Journal of Applied Crystallography, 47 (2014) 1784-1789; Toby and Von Dreele, Journal of Applied Crystallography, 46 (2013) 544-549). SAXS data was calibrated with silver behenate (AgBeh) and instrument parameters such as sample-to-detector distance, detector tilt and beam center were refined as described elsewhere (Leontowich et al., 2021). SAXS patterns were integrated from q=0.008 to q=0.53 Å$^{-1}$.

Surface tension measurements-A clear gel containing 33.3 wt % glycerol, 63.3 wt % GMO and 3.33 wt % SO was prepared. A solution of 2 wt % of the GMO+SO+glycerol gel in water was prepared and analyzed. Static surface tension measurements were conducted using a Sigma force tensiometer (Biolin Scientific, USA) and a platinum du Nouy ring (having a 2 cm diameter), to determine the surface tension of the 2 wt % GMO+SO+glycerol solution, as well as a 0.1 wt % SO solution in water. Milli-Q water was used. The surface tension was estimated using (1):

$$\gamma = \frac{F}{4\pi R} f \qquad (1)$$

where F is the maximum force measured when pulling the du Nouy ring outside of the water phase (i.e., the force required to break the lamella), R is the average radius of the Du Nuoy ring used and f is the Huh and Mason correction factor calculated as f=R/r (R=radius of the du Nouy ring and r=radius of the wire). All measurements were conducted in triplicate, at room temperature (20° C.).

Compression isotherms—Compression isotherms were measured at the air-water interface using a Kibron Microtrough G1 Langmuir-Blodgett trough (Kibron, Sweden), controlled using KBN LayerXPro software (Kibron, Sweden). The area of the trough was 16,500 mm$^2$. Interfacial films were compressed from 16,500 mm$^2$ to 1,650 mm$^2$, using mobile barriers moving at a speed of 100 mm/min. The pressure was monitored using a Wilhelmy plate during compression. The following aqueous solutions were used: 1) 2 wt % aqueous solution of a clear gel containing 63.3 wt % GMO, 3.33 wt % SO, and 33.3 wt % glycerol, 2) 0.1 wt % SO in water. Measurements were conducted in triplicate at least.

Conductivity measurements—The electrical conductivity of both a 2 wt % aqueous solution of a clear gel containing 33.3 wt % glycerol, 63.3 wt % GMO, 3.33 wt % SO, and a 0.1 wt % SO solution in water, were carried out to understand the SO-GMO interactions. Conductivity measurements were conducted using a Thermo Scientific™ Orion Star™ A212 Conductivity Benchtop Meter, at 20° C. Milli-Q water was used.

Results

Figure 14:
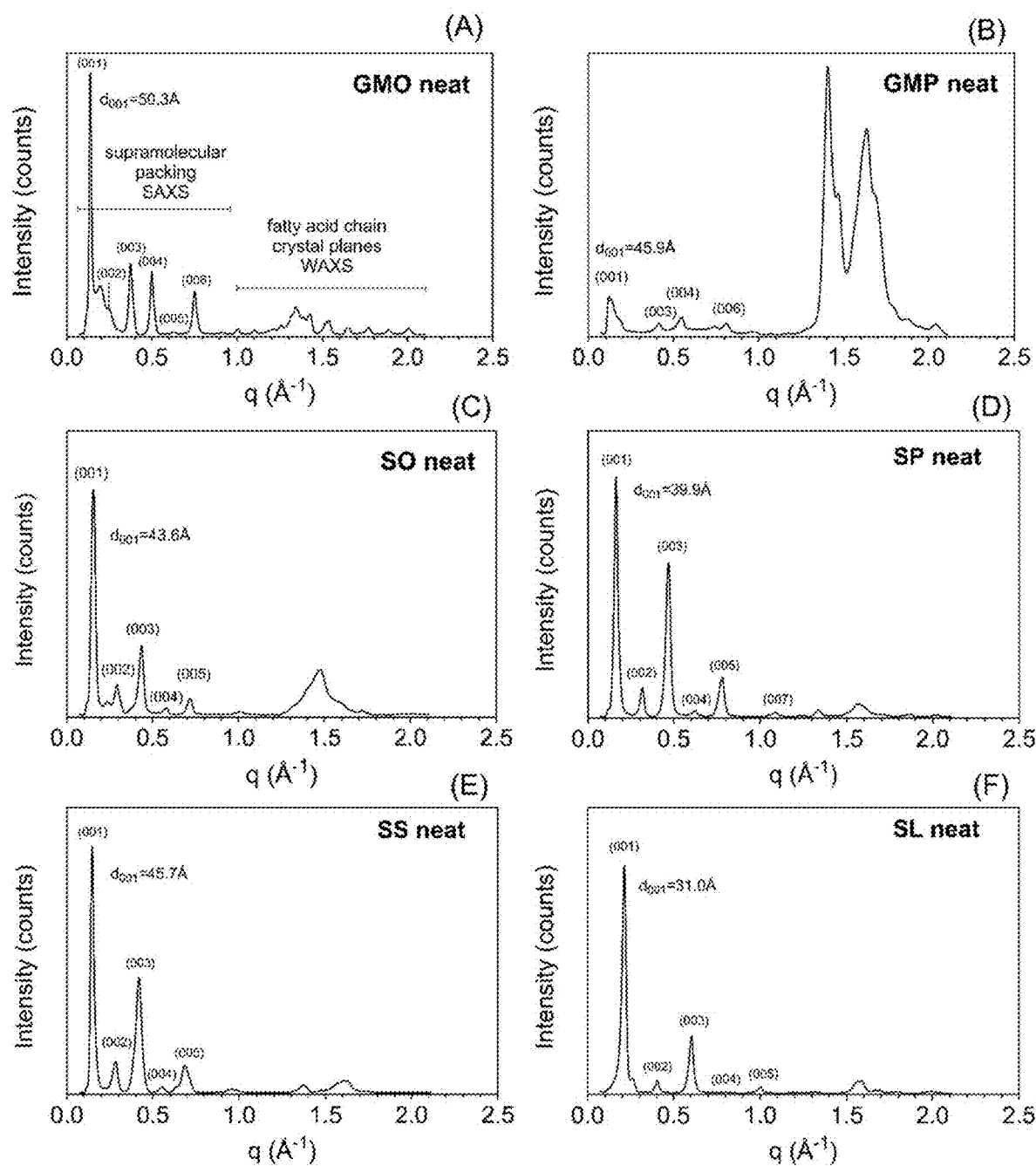
FIG. 14 illustrates powder X-ray diffraction spectra of neat A) glyceryl monooleate (GMO), B) glyceryl monopalmitate (GMP), C) sodium oleate (SO), and D) sodium palmitate (SP), E) sodium stearate (SS), and F) sodium laurate (SL), obtained at 21° C.

The powder XRD spectra of the neat solids of glyceryl monooleate, glyceryl monopalmitate, sodium oleate, sodium palmitate, sodium stearate and sodium laurate were obtained and shown in FIG. 14. The small-angle scattering (SAXS) region characterizes the supramolecular assembly of these molecules. All of these solid crystalline samples had a lamellar nanostructure, characterized by reflections spaced in the ratio 1:2:3:4:5:6 in the scattering vector (q) region q<1 Å$^{-1}$. The nanoscale lamellae were crystalline in nature, as can be discerned from the characteristic reflections in the wide-angle region (WAXS) above q>1 Å$^{-1}$. These reflections arise from crystalline planes formed from the ethylene groups within the long hydrocarbon-like chains of fatty acids. The absence of reflections in the WAXS region, with SAXS peaks still evident, signify the existence of a liquid crystal.

Figure 15:
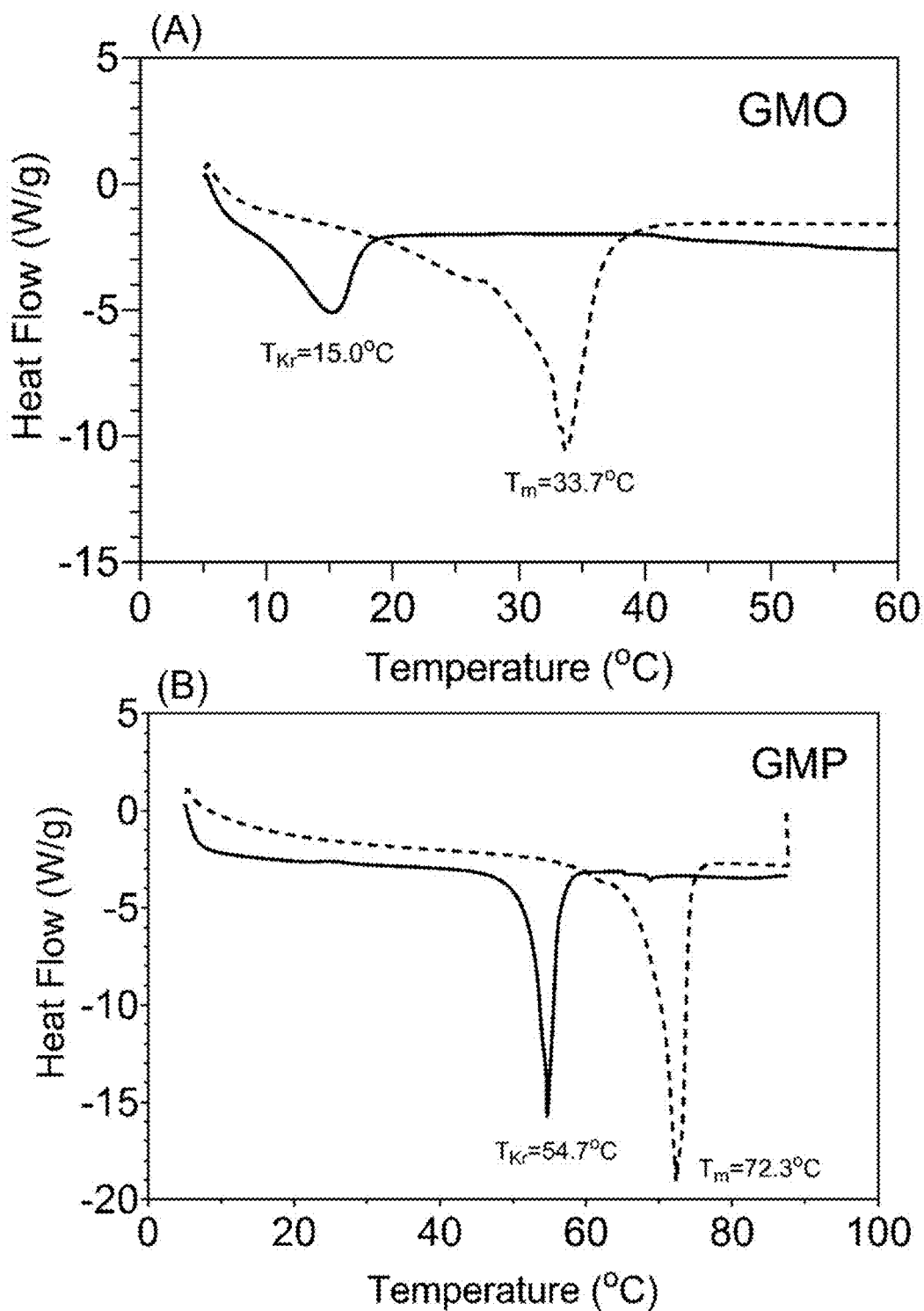
FIG. 15 illustrates differential scanning calorimetry of neat (dashed line) and 10 wt % aqueous mixtures (solid line) of A) glyceryl monooleate (GMO) and B) glyceryl monopalmitate (GMP)

Two DSC heating runs are depicted for each of the monoglycerides used, namely glyceryl monooleate (GMO), and glyceryl monopalmitate (GMP), shown in FIGS. 15A and 15B, respectively. The highest transition temperature corresponds to the melting of the solid crystals ($T_m$), while the lower temperature corresponds to the melting of the hydrated crystal at the Krafft temperature ($T_{Kr}$). The Krafft temperature is the lowest temperature at which a surfactant will form micelles in water since it needs to be in a fluid state to do so. In the present case, the Krafft temperature characterizes the solid gel to liquid crystalline transition temperature of the self-assembled monoglycerides. Note how much lower the Krafft temperature is relative to the melting temperature of the neat monoglyceride solid. The lower Krafft and melting temperatures for GMO relative to GMP, make this monoglyceride much more useful in a food processing plant since mixing and homogenizing can take place at lower temperatures.

Figure 16:
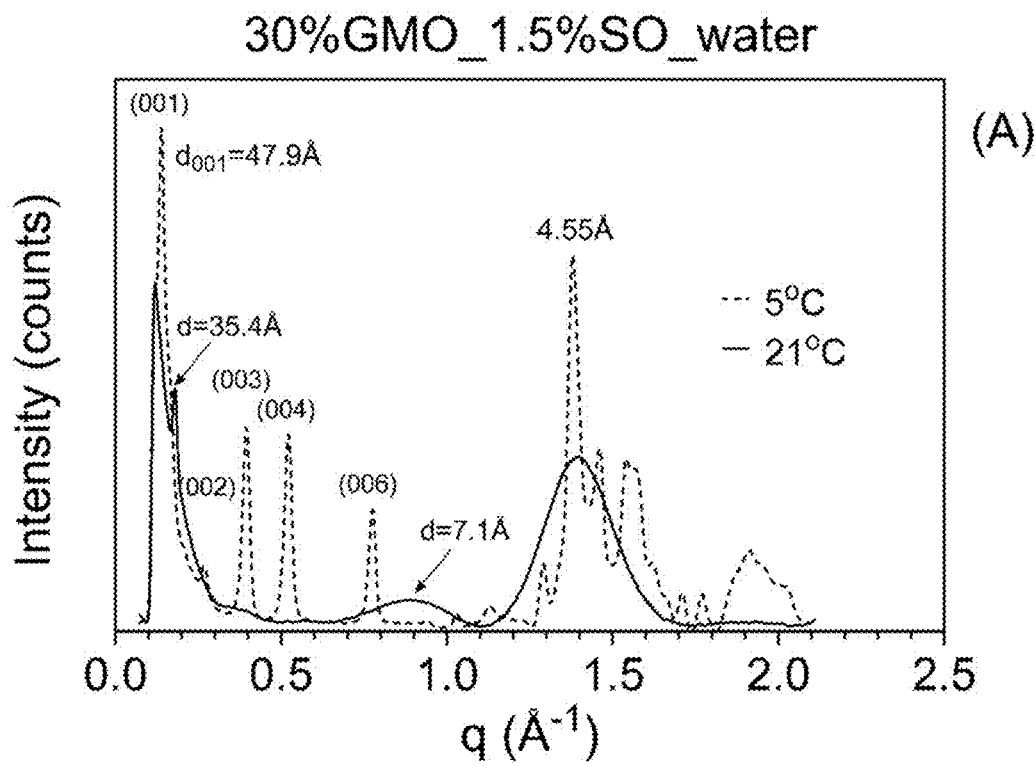
FIG. 16 illustrates powder X-ray diffraction spectra of A) 30 wt % glyceryl monooleate (GMO) plus 1.5 wt % sodium oleate (SO) in water at 5° C. and 21° C., and B) synchrotron small-angle x-ray scattering spectrum of 30 wt % GMO+1.5 wt % SO in water at room temperature.
Figure 16:
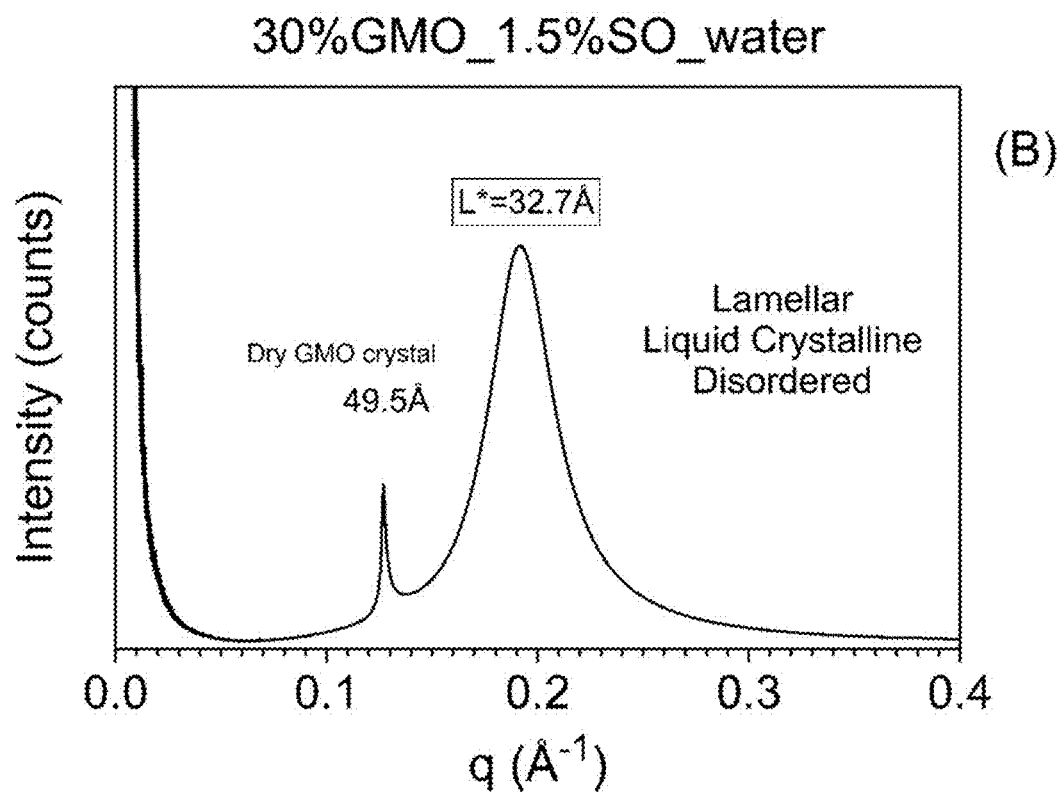

When combined in water and heated above their Krafft temperatures, GMO and SO form lamellar phases, which are liquid crystalline above their Krafft temperatures and are in a crystalline, solid gel, state below their Krafft temperature (FIG. 16A). This is discerned by the absence of reflections in the wide-angle region q>1 Å$^{-1}$. For GMO+SO in water at 5° C., the lamellae were smaller than in the neat GMO crystals (FIG. 14A), suggesting a slightly different arrangement of the GMO molecules in the solid state in the presence of water and SO. Above the Krafft temperature, however, the GMO+SO, now in a liquid crystalline state, displayed a hydrated bilayer size of 35.4 Å (FIG. 16A). This corresponds to the (001) plane, with a possible higher order reflection observed at 7.01 Å, which would correspond to the (005) plane.

To confirm the existence of this unique lamellar phase in the present system, synchrotron Small-Angle X-ray Scattering (sSAXS) was carried out in the Canadian Light Source in Saskatoon, Saskatchewan, Canada. A better resolution of scattering events at low angles was possible, confirming the existence of this unique lamellar phase (FIG. 16B). The size estimated was 32.7 Å, which closely agreed with in-house measurements (FIG. 16A). Thus, the structure responsible for the observed functionality in products described herein is a unique liquid crystalline lamellar structure of a complex between GMO and SO.

Figure 17:
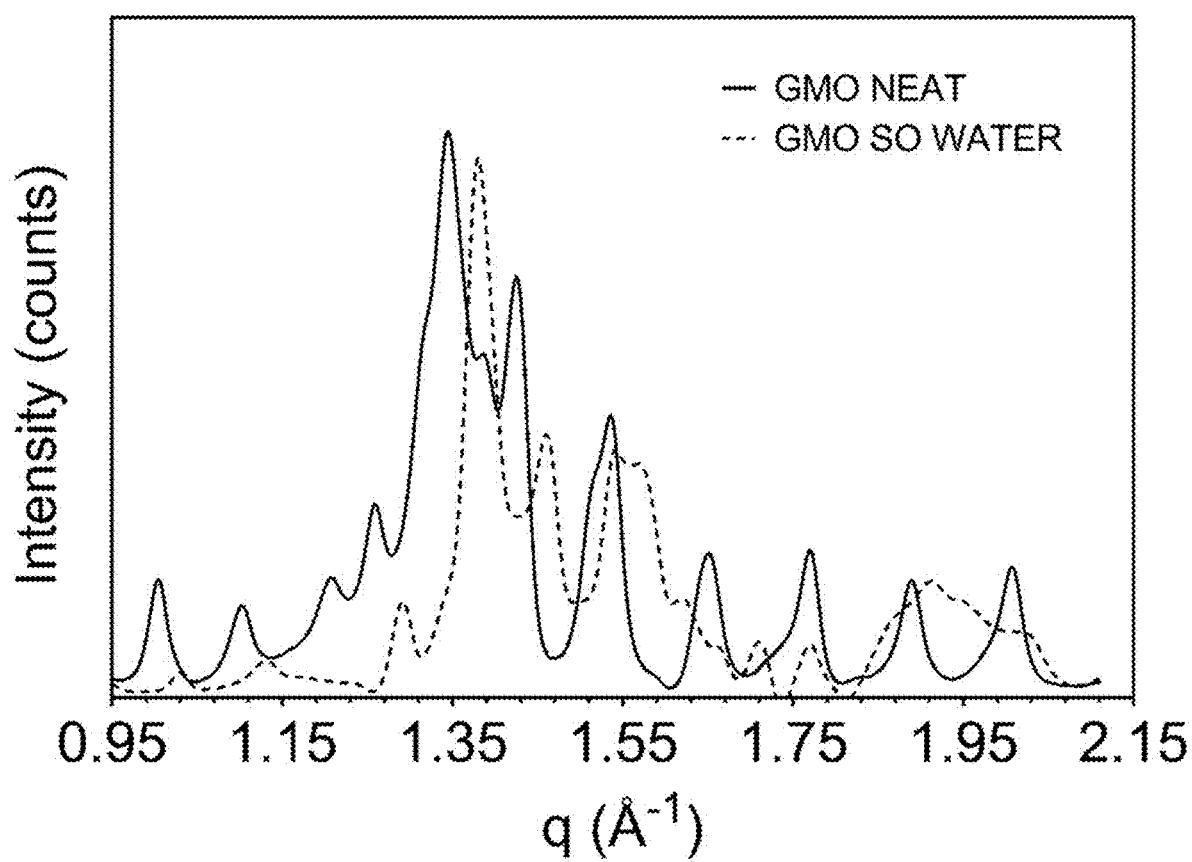
FIG. 17 illustrates wide-angle powder X-ray diffraction spectra of 30 wt % GMO+1.5 wt % SO in water and neat GMO at 5° C.
Figure 18:
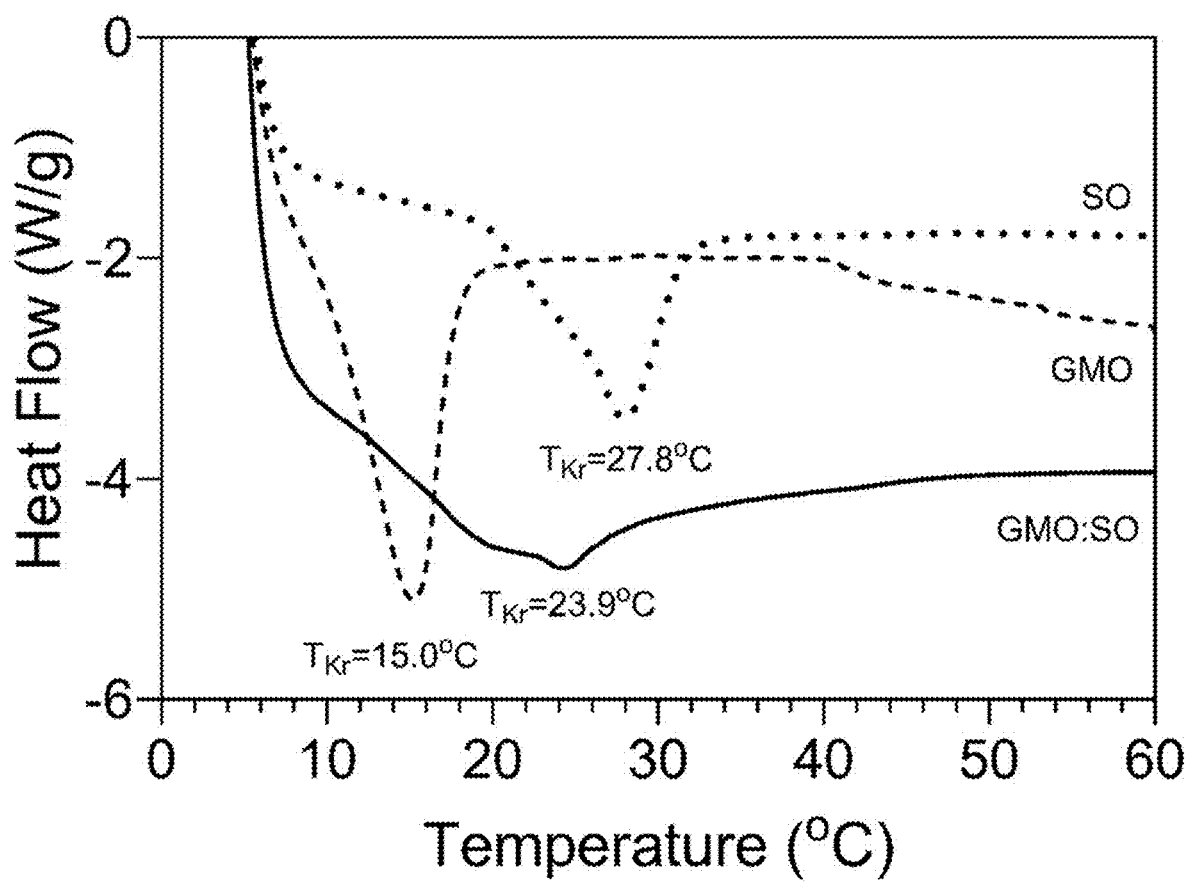
FIG. 18 graphically illustrates differential scanning calorimetric heating thermograms of 40 wt % SO in water, 10 wt % GMO in water and 30 wt % GMO+1.5 wt % SO in water.

The wide-angle powder XRD spectra of neat GMO and 30 wt % GMO+1.5% SO in water (FIG. 17) suggest that the solid-state crystal structure of GMO below the Krafft temperature is different from that of neat GMO crystals, even though they share a similar lamellar nanostructure (FIGS. 14A and 16A). This suggests that the SO incorporates within the crystal lattice of GMO, forming a mixed crystal. The GMO and SO are structurally complementary or compatible in the solid state (given that they both comprise oleic acid in their structure), allowing for the co-crystallization of the two species into a single mixed crystal. FIG. 18 corroborates the fact that GMO and SO form a mixed crystal below their Krafft temperature, since only one peak with an intermediate Krafft temperature between that of GMO and SO was observed.

The surface tension of 2 wt % GMO+SO+glycerol gels in water was 25.75±0.02 mN/m, and the surface tension of 0.1 wt % SO in water was 24.39±0.16 mN/m. GMO is not soluble in water, but there is no precipitate when SO and GMO are both in solution. This suggests that SO induces solubilisation of GMO into a lamellar liquid crystalline form. The fact that the surface tensions of GMO+SO and SO are similar suggests that SO interacts with GMO and both are co-present at the interface, since there was no GMO precipitate observed. The interfacial behaviour of the GMO+SO complex is dominated by SO since the surface tension of SO and GMO+SO are the same.

Figure 19:
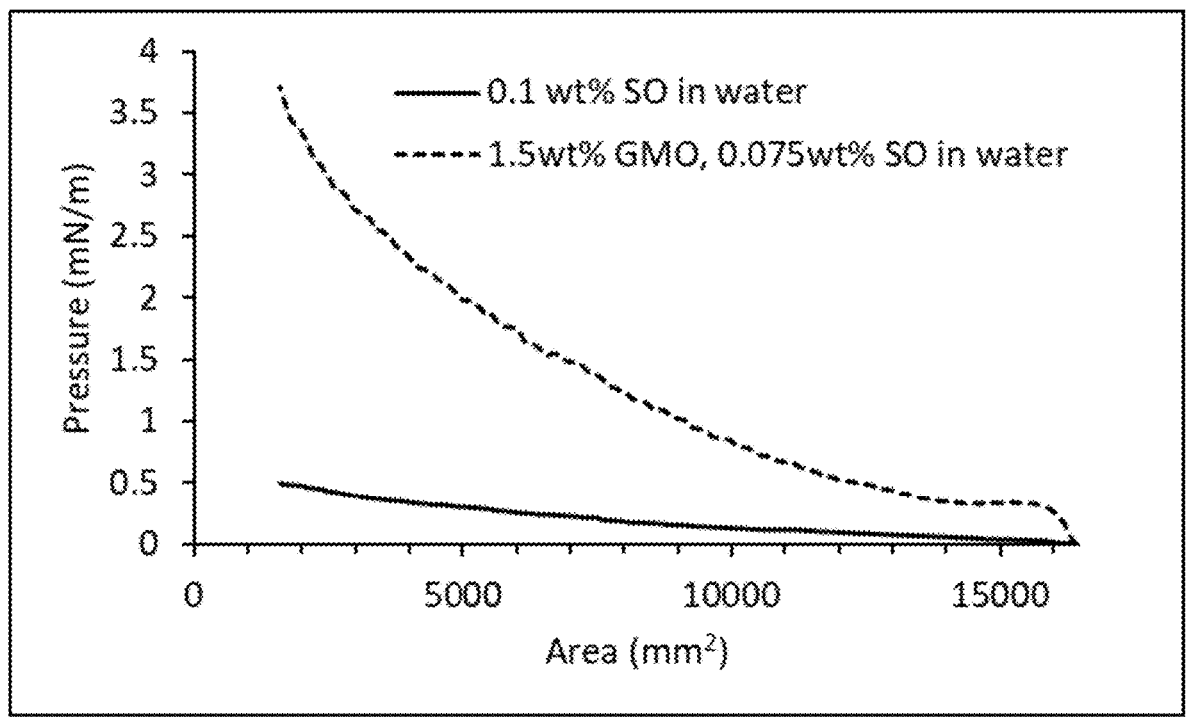
FIG. 19 graphically illustrates the compression isotherm for both 1.5 wt % GMO plus 0.075 wt % SO, and 0.1 wt % SO at a water-air interface at 20° C.

The interfacial films of GMO+SO and SO alone were quite flexible/soft, although they were slightly more rigid for GMO+SO. The maximum pressure achieved upon compression (relative to the starting point) was 0.47±0.03 mN/m for 0.1 wt % SO and 3.90±1.22 mN/m for 2 wt % GMO+SO gels in water as shown in FIG. 19.

The conductivity of the gel in water was 57.33 µS/cm, whereas the conductivity of SO in water was 150.5 µS/cm. This indicates that the charges on the carboxyl group of the fatty acid salt were either neutralized due to interactions between SO and GMO, or the carboxyl group was not exposed due to interactions between GMO and SO.

The GMO and SO formed a complex due to a marked structural complementarity between the fatty acid in the monoglyceride and the fatty acid salt, as well as similar Krafft temperatures. Structural complementarity/compatibility refers to similarities in chain length and molecular shape/geometry between the fatty acid of the monoglyceride and the fatty acid salt.

Example 11. Interaction of GMO+SO with Air Bubbles and Fat Globules

As described in Example 1, the method of preparing a product in accordance with the invention starts with the addition of sugar, glucose, gums, proteins, and/or emulsifiers to deionized water. Under continuous overhead mixing, the solution was heated gradually to above 30° C., and molten oil was then added and homogenized using a hand-held rotostator device (Ultra-Turrax, IKA Works Inc., Wilmington, DE, USA). The solution was then heated with continuous mixing to 75° C. and held at that temperature for 15 min for pasteurization, if being pasteurized. Upon pasteurization, the mix was homogenized with one pass through an APV SPX two-stage homogenizer (2000 psi followed by 500 psi). The pasteurized and homogenized mix was then collected and stored overnight in a fridge at 5° C. to allow for ageing of the mix. This allowed for hydration of the gums, proteins and emulsifiers, and also allowed for more complete crystallization of the fat used.

TABLE 15

| Formulation | |
| --- | --- |
| Ingredient | Composition (wt %) |
| sugar | 13.30 |
| glucose | 7.30 |
| dextrose | 5.62 |
| xanthan gum | 0.10 |
| GMO | 1.50 |
| SO | 0.075 |
| vanilla | 1.70 |
| water | 70.41 |

Light Microscopy. Light microscopy of the solution was carried out using an OMAX model M838PL-C180U3 light microscope (OMAX, Kent, WA, USA) with a 18 MP digital camera. A small drop of solution was placed onto a glass microscope slide and thinned with a plastic pipette. A coverslip was not used since this was found to destroy the structures in the mixture. Images were captured using a 10× objective lens, using ToupView software (v3.7, ToupTek Photonics, Hangzhou, China). The sample was imaged in multiple locations to ensure accurate representation of the structures.

Figure 20:
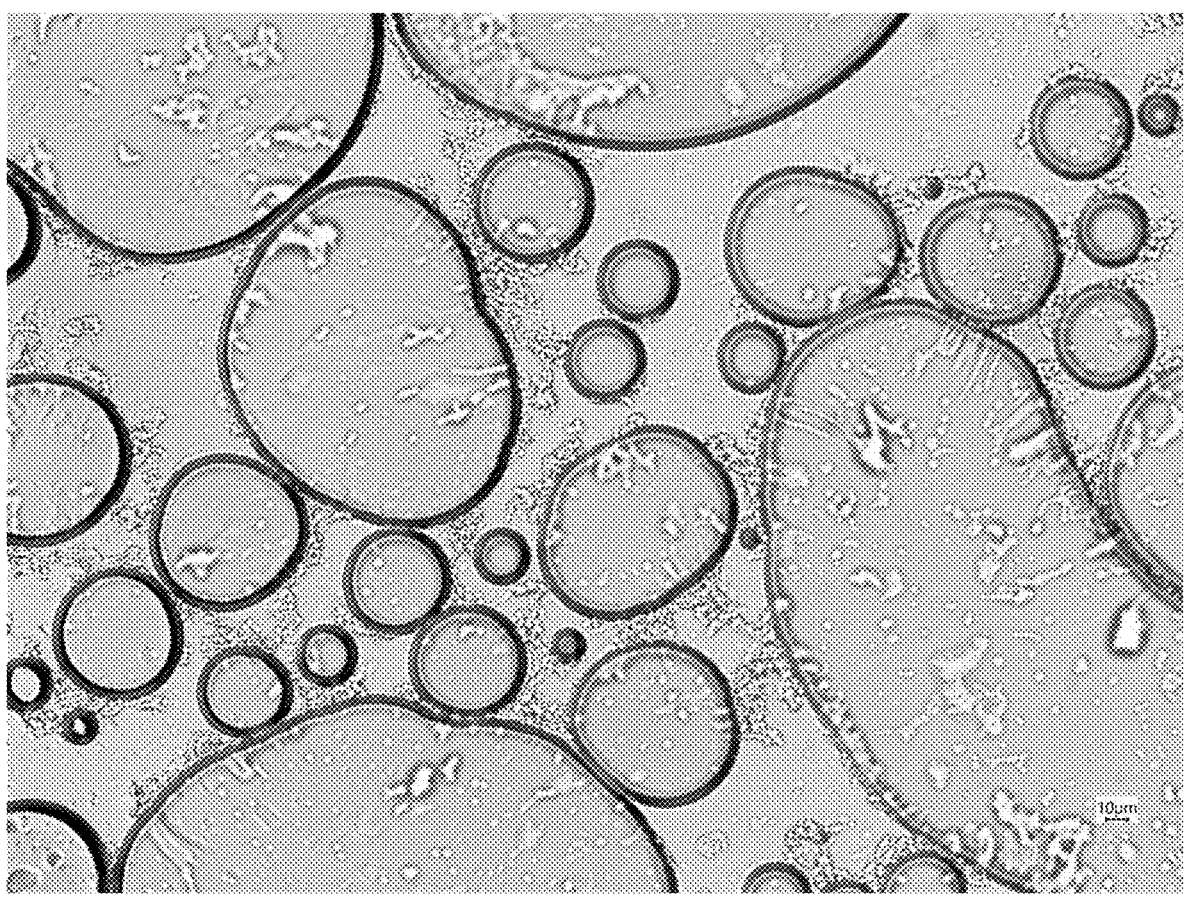
FIG. 20 is a light micrograph of a formulation comprising 1.5 wt % GMO+0.075 wt % SO.

Micrographs of the solution confirmed the formation of a complex that interacts with the air bubbles, adhering to the bubble surface and functioning to connect the bubbles together as shown in FIG. 20. This results in the creation of overrun due to the interaction and stabilization of the air-water interface by the GMO+SO complex, and the creation of a connected GMO+SO network between bubbles. This is surprisingly similar to the fat globule-air bubble network formation due to partial coalescence of fat globules which occurs in products such as dairy ice cream, but occurs with little or no fat.

These experiments point to a mechanism for the activity of this unique GMO+SO complex as a structuring agent. The GMO+SO complex is readily mixed in its liquid crystalline state with the other ingredients in the formulations described herein at room temperature. The mixture is then pasteurized and homogenized while in this liquid crystalline state, achieving maximal interaction with the other components and any fat present. The complex also emulsifies any little amount of fat present. Following aging, the GMO+SO complex becomes a crystalline solid gel, forming a strong structure in the mix. The structure formed may then be frozen, and/or air is incorporated, and a soft, melt-resistant structure results with significant overrun. Thus, the present GMO+SO complex and process advantageously mimics a partial-coalescence process without the requirement of significant levels of fat.

Example 12. Glyceryl Monooleate and Sodium Stearate Mixtures

The possibility of combining a monoglyceride with a non-corresponding fatty acid salt was considered, and specifically, the combination of glyceryl monooleate with the co-surfactant sodium stearate (SS) instead of sodium oleate (SO) was explored.

A formulation comprising 1.5 wt % GMO and 0.075 wt % SS was prepared and physical characteristics determined. All other components were as shown in Table 16 below.

TABLE 16

Formulation comprising GMO + SS and pea protein concentrate (PPC)

| Ingredients | Composition (wt %) |
| --- | --- |
| sugar | 13 |
| glucose | 13 |
| gum guar | 0 |
| coconut oil | 1 |
| GMO | 1 |
| SS | 0.05 |
| MAGs + DAGs | 0 |
| pea protein concentrate (PPC) | 2 |
| vanilla | 0 |
| water | 69.95 |
| glycerin | 0 |

Figure 21:
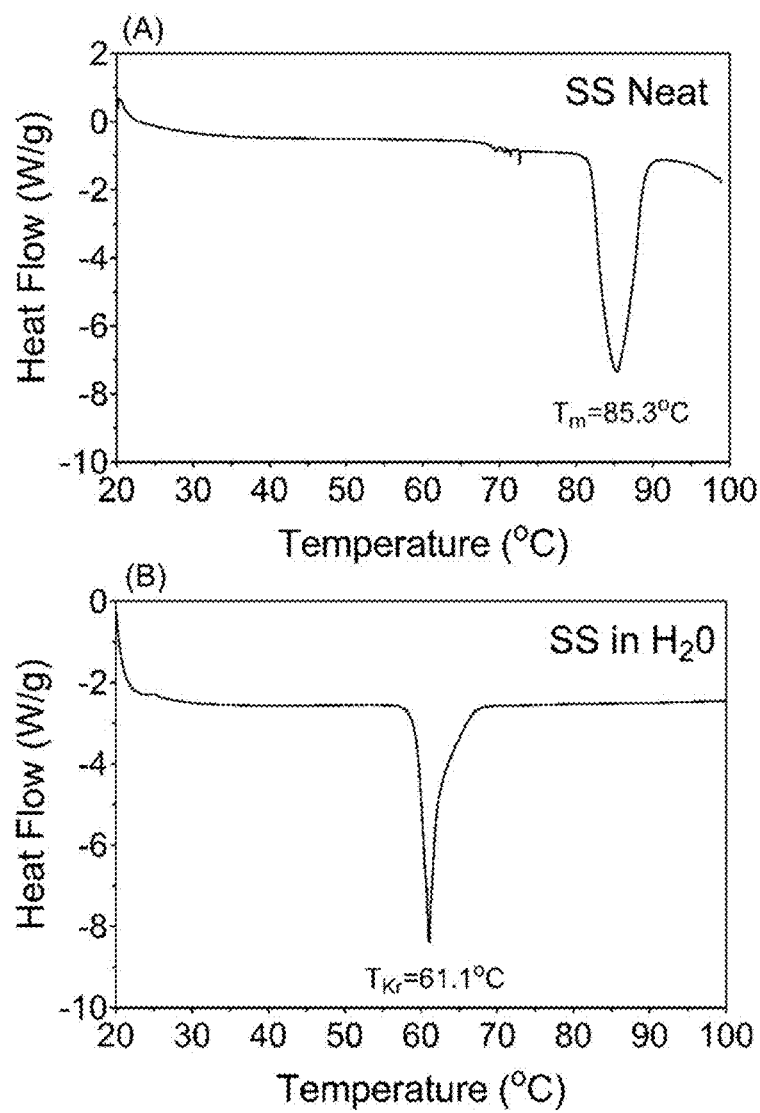
FIG. 21 graphically illustrates differential scanning calorimetric heating thermograms of sodium stearate (SS) in its A) neat state and in its B) hydrated state at 30 wt % concentration in water.
Figure 22:
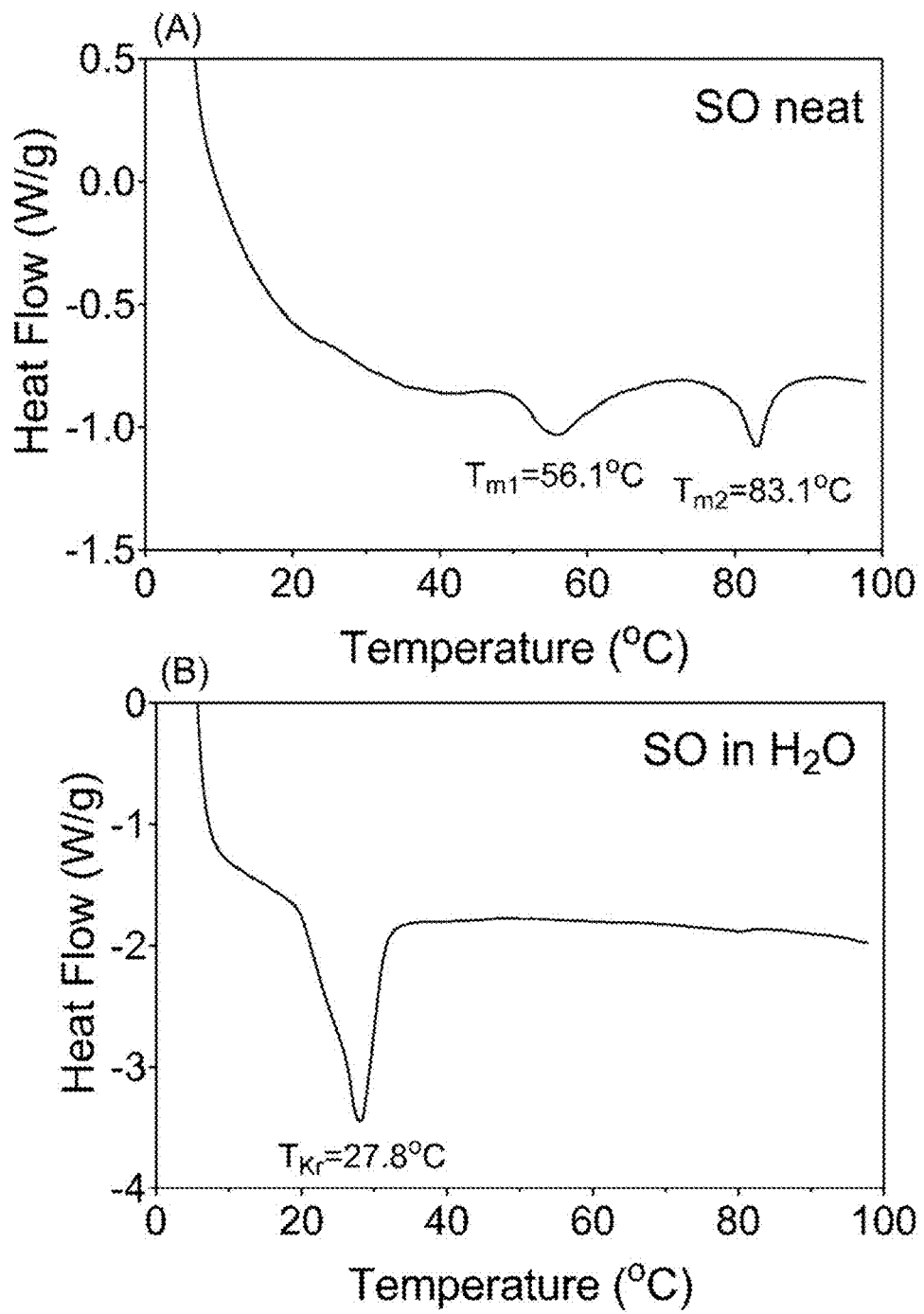
FIG. 22 graphically illustrates differential scanning calorimetric heating thermograms of sodium oleate (SO) in its A) neat state and in its B) hydrated state at 40 wt % concentration in water.

The first problem encountered was the high melting point and Krafft temperatures of sodium stearate. The melting temperature of sodium stearate was 85.3° C. (FIG. 21A), while the Krafft temperature was 61.1° C. (FIG. 21B). In contrast, the Krafft temperature of sodium oleate was 27.8° C. (FIG. 22B). Thus, in order to use SS, the formulation had to be initially heated to a temperature above 80° C. to melt the SS into the mix. This is an excessively high temperature for practical applications. Moreover, for complete dissolution, this high temperature had to be maintained for 10-15 minutes, which is impractical. The melting temperatures of GMO and SO are 33.7° C. (FIG. 15A) and 56.1° C. (FIG. 22A), respectively, while their Krafft temperatures are 15° C. (FIG. 15A) and 27.8° C. (FIG. 22B), respectively. Thus, mixing and incorporation into a food formulation takes place readily upon mild heating in a processing plant. Added as a gel rather than added as a powder, either based on water or glycerol, the temperature would have to be increased only above the Krafft temperature of the materials, which for GMO+SO would be about 30° C. for more rapid dissolution.

The other issue encountered with this formulation was that when cooled, all the sodium stearate crystallized and precipitated out of solution. This was then followed by separation of the GMO from the solution, with a complete loss of the beneficial effect.

Thus, it appears that if the crystallization and Krafft temperatures of the monoglyceride and the fatty acid salt are very different, then a complex is unlikely to form, or unlikely to form to a sufficient extent. This appears to be the case with GMO and SS. Once the fatty acid salt precipitated out of solution, then the monoglyceride, such as GMO, does not form a soluble lamellar phase anymore and also precipitates out of solution. GMO by itself is not soluble in water, while the GMO+SO complex is water soluble.

Figure 23:
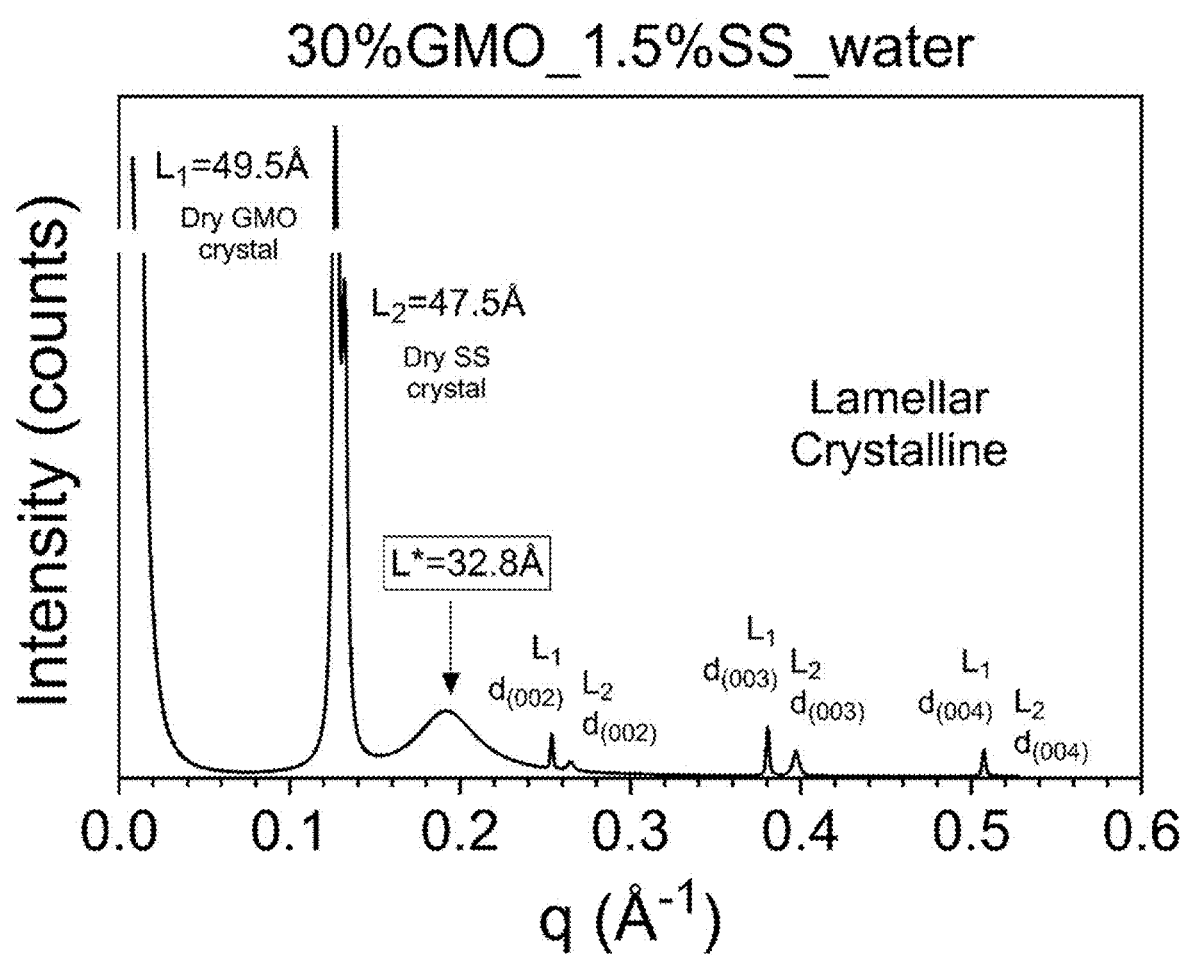
FIG. 23 graphically illustrates a synchrotron small-angle X-ray scattering spectrum of 30 wt % GMO+1.5 wt % sodium stearate in water.

Synchtrotron Small-Angle X-ray Scattering (sSAXS) was carried out as described previously herein on a gel of 30 wt % GMO, 1.5 wt % SS in water. Two reflections were observed in the SAXS region corresponding to the dry crystals of GMO and SS (FIG. 23). The higher order reflections of these main reflections were also clearly observed. Thus, the majority of the GMO and SS did not form a complex, as was the case for GMO+SO (FIG. 16B), and just precipitated out of solution. Interestingly, the presence of the GMO disordered liquid crystalline lamellar phase L* was also detected (FIG. 16B and FIG. 23), with a reflection at 32.8 Å. Thus, it would seem that SS could promote the formation of the special phase associated with the enhanced functionality of the GMO+SO complex. However, the amount formed was very small relative to what SO could induce.

Example 13. Glyceryl Monooleate and Sodium Laurate Mixtures

In this example, the possibility of creating a complex between glyceryl monooleate and a different non-corresponding fatty acid salt, sodium laurate, was investigated.

Figure 24:
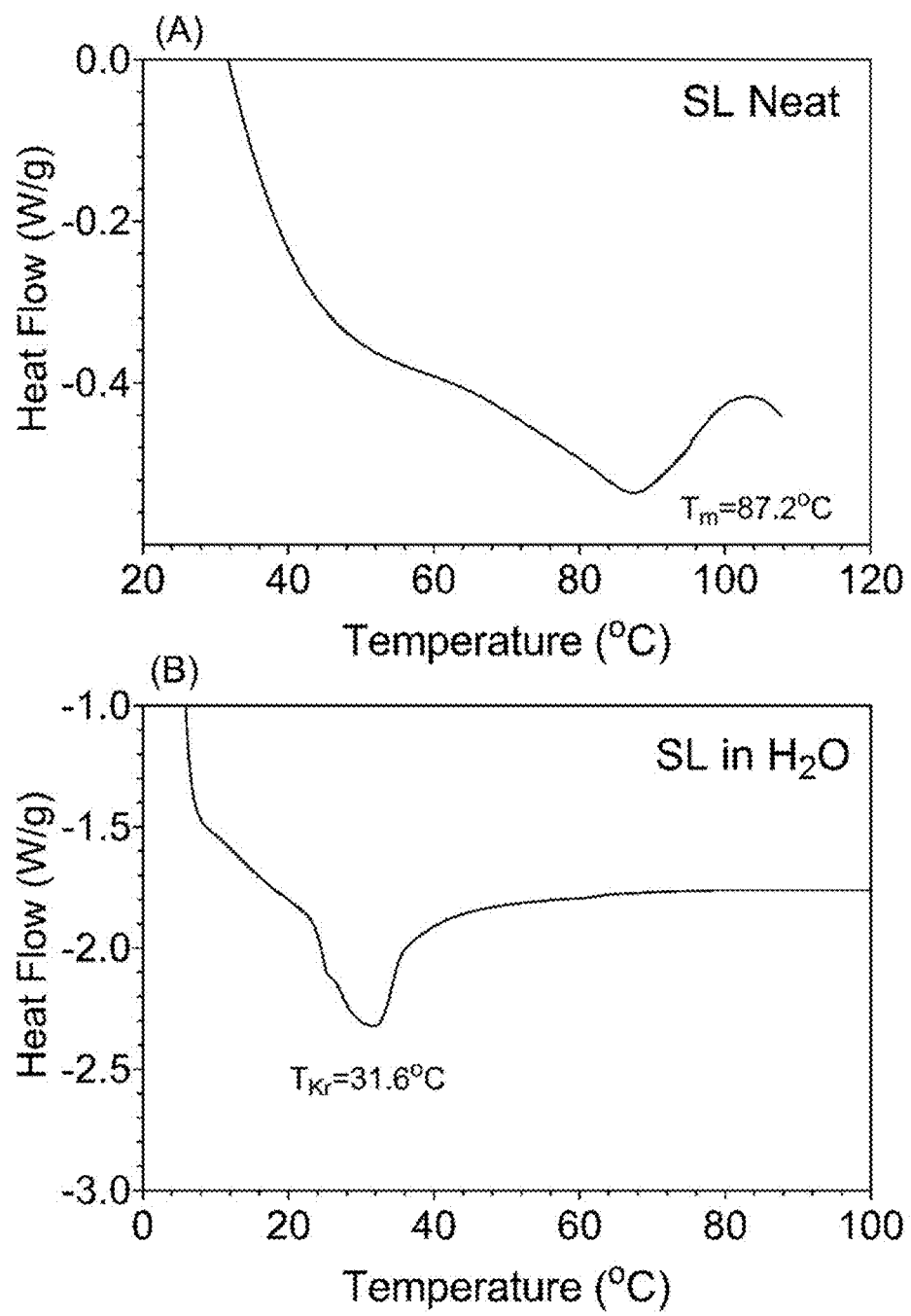
FIG. 24 graphically illustrates the differential scanning calorimetry trace of (A) neat sodium laurate (SL) and (B) a 40 wt % SL sample in water.

This fatty acid salt was selected because its Krafft temperature is similar to that of GMO, within 20° C. of each other. It was hypothesized that this is important for the monoglyceride and the fatty acid to interact and form a complex, or even to co-exist in the gel state. If their Krafft temperatures were too different, the monoglyceride and fatty acid salt may phase separate upon cooling and not form a complex. Sodium laurate (SL) has a Krafft temperature of 31.6° C. (FIG. 24B), and GMO has a Krafft temperature of 15° C. (FIG. 15A). In this case, it was believed that the sodium laurate and the GMO would form mixed micelles above their Krafft temperature, but it was uncertain if they would form a mixed crystal in the solid-state below their Krafft temperature. Moreover, it was unknown as to whether the GMO and SL mixture would perform like the GMO+SO complex in the formation of a frozen product as described herein.

The GMO+SL mixture was first tested for its ability to make a frozen product. The product was prepared as described in Example 1 and characterized using the methods described in Example 2. A 66.6% GMO+SL glycerol gel was prepared (66.6 wt % concentration of 19:1 w/w GMO+SO in glycerol). The formula used and results are reported below:

TABLE 17

GMO + SL Formulation

| Ingredients | Composition (wt %) |
| --- | --- |
| sugar | 13 |
| glucose | 13 |
| coconut oil | 1 |
| 66.6% GMO + SL glycerol gel | 3% |
| water | 72.62 |
| vanilla | 0.1 |
| guar gum | 0.25 |
| Overrun (% v/v) | 91.3 +/− 2.40 |
| Penetration at −18° C. (1/10 mm) | 106.6 +/− 0.89 |
| Meltdown after 30 min (wt %) | 6.1 +/− 0.057 |

The GMO+SL glycerol complex was extremely efficient in creating an overrun of 91.3 wt %. The frozen dessert was very soft, with a penetration depth at −18° C. of over 106 1/10 mm. Meltdown resistance was also good with only a 6 wt % melt after 30 minutes at room temperature. This low meltdown was attributed to the use of guar gum at 0.25 wt % levels. The GMO and SL combination exhibited a similar functionality to that of GMO with SO.

Figure 25:
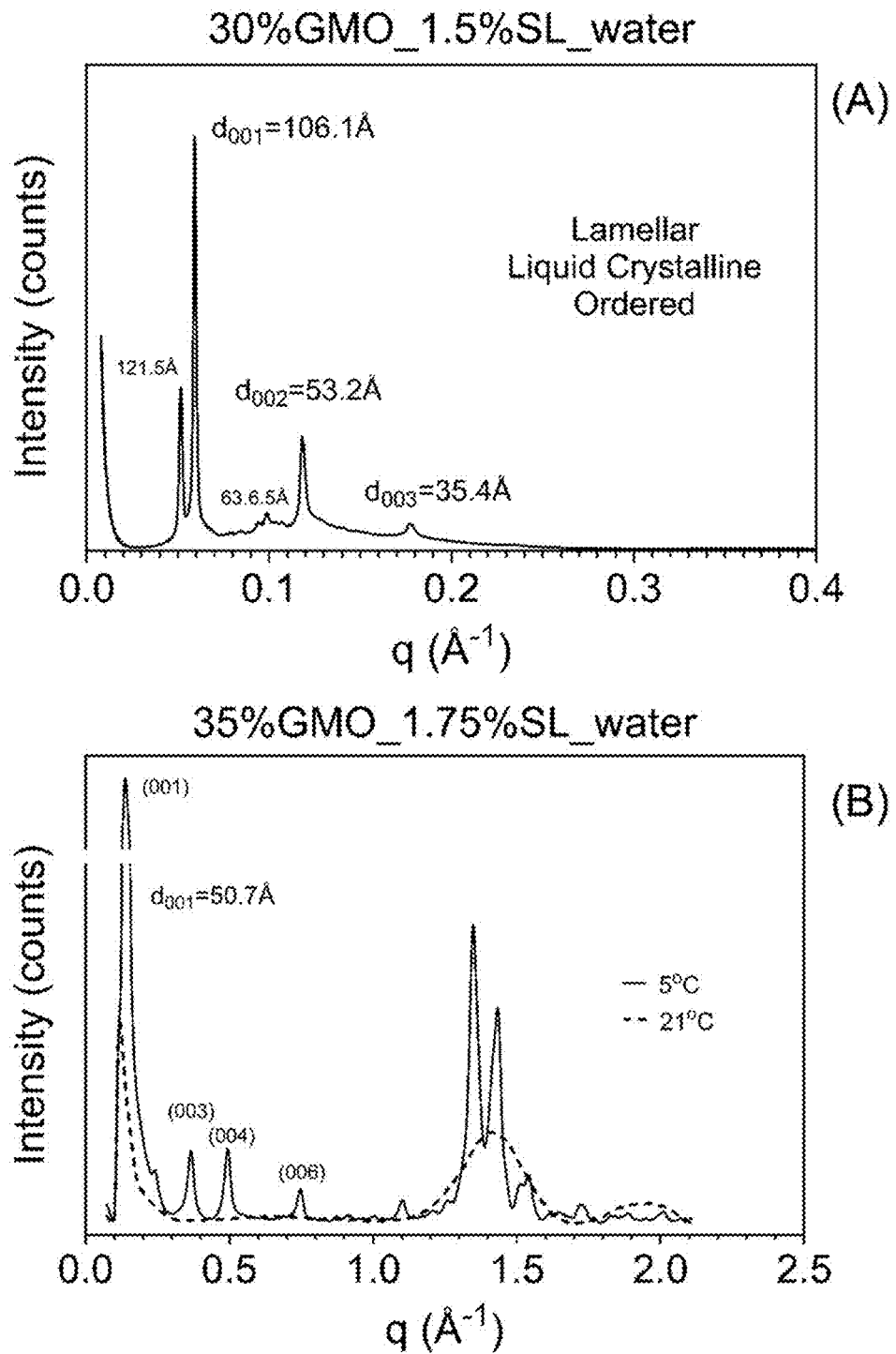
FIG. 25 graphically illustrates a (A) synchrotron small-angle X-ray scattering spectrum of 30 wt % GMO+1.5 wt % sodium laurate (SL) in water, and (B) powder X-ray diffraction spectra of 30 wt % GMO+1.5 wt % SL in water at 5° C. and 21° C.

Synchrotron SAXS and powder XRD were used to characterize the structure of a 30 wt % GMO, 1.5 wt % SL and 68.5 wt % water mixture as previously described. The room temperature sSAXS spectrum is shown in FIG. 25A, while the room temperature and 5° C. WAXS and "near SAXS" spectra are shown in FIG. 25B. One can clearly see the formation of a very large and ordered liquid crystalline lamellar phase for GMO+SL in water, of approximately 106 Å in size. One can also clearly observe higher order reflections, up to (003). This is different from the GMO+SO complex (FIG. 16B), which forms a very disorganized liquid crystalline lamellar structure of about 32-35 Å at room temperature, with no higher order reflections evident.

At the WAXS level (FIG. 25B), the lack of reflections for $q>1$ Å$^{-1}$ suggest the existence of a liquid crystal at room temperature for the GMO+SL mixture. As expected, below the Krafft temperature of GMO, at 5° C., a lamellar crystalline structure was evident.

These results suggest that the formation of a liquid crystalline structure above the Krafft temperature of the GMO and fatty acid salt is necessary for the observed functionality in a frozen product, and that both species need to be present physically in the mixed micelle formed (i.e. a mixed liquid crystalline structure).

Figure 26:
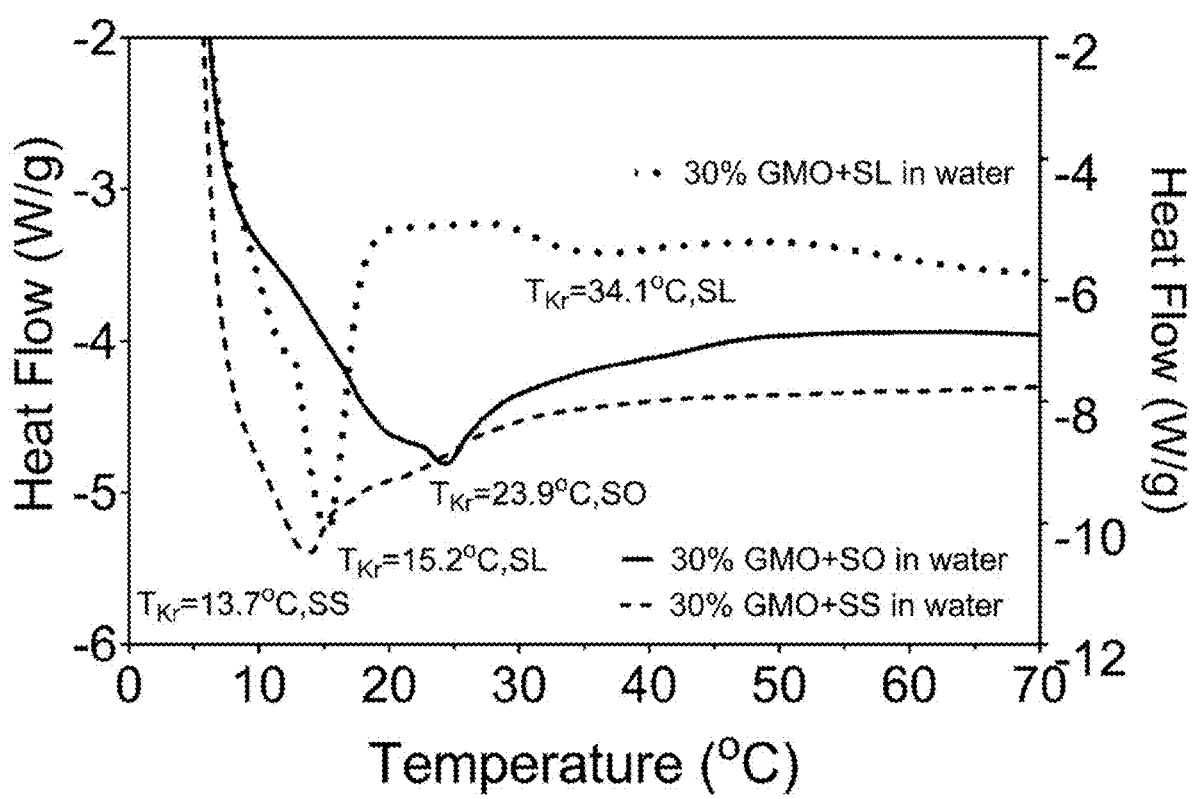
FIG. 26 graphically illustrates the differential scanning calorimetry trace of 30 wt % GMO plus 1.5 wt % of either sodium oleate (SO), sodium stearate (SS) or sodium laurate (SL) in water.

DSC runs were conducted. For this purpose, 30 wt % GMO, 1.5 wt % fatty acid salt in water were analyzed for SO, SS and SL, and results are shown in FIG. 26. One can clearly observe that a single Krafft temperature peak is evident for the GMO+SO sample, suggesting the formation of a mixed crystal in the solid gel crystalline state. For the GMO+SS sample, only the Krafft transition for GMO is evident, while none was observed for SS. This suggests that the SS must have crystallized from solution at a high temperature and was removed from the gel, leaving a gel formed by GMO alone. For the GMO+SL sample, the results were quite revealing. One can observe the transitions for both GMO and SL, but separate from each other. This suggests that the SL and the GMO were both present in the gel, but did not form a complex in the solid state, namely a mixed crystal. This was possible due to the relative closeness in the Krafft temperatures of GMO and SL. This suggests that the presence of the GMO and fatty acid salt in the gel was necessary for the observed functionality of SO and SL in a GMO gel, but the formation of a mixed crystal, or molecular complex, in the solid state was not. This co-existence of the two species was necessary for the formation of a liquid crystalline lamellar phase for GMO and its observed functionality.

Example 14. Microstructure of the Dilute GMO+Fatty Acid Mixtures in Water

Figure 27:
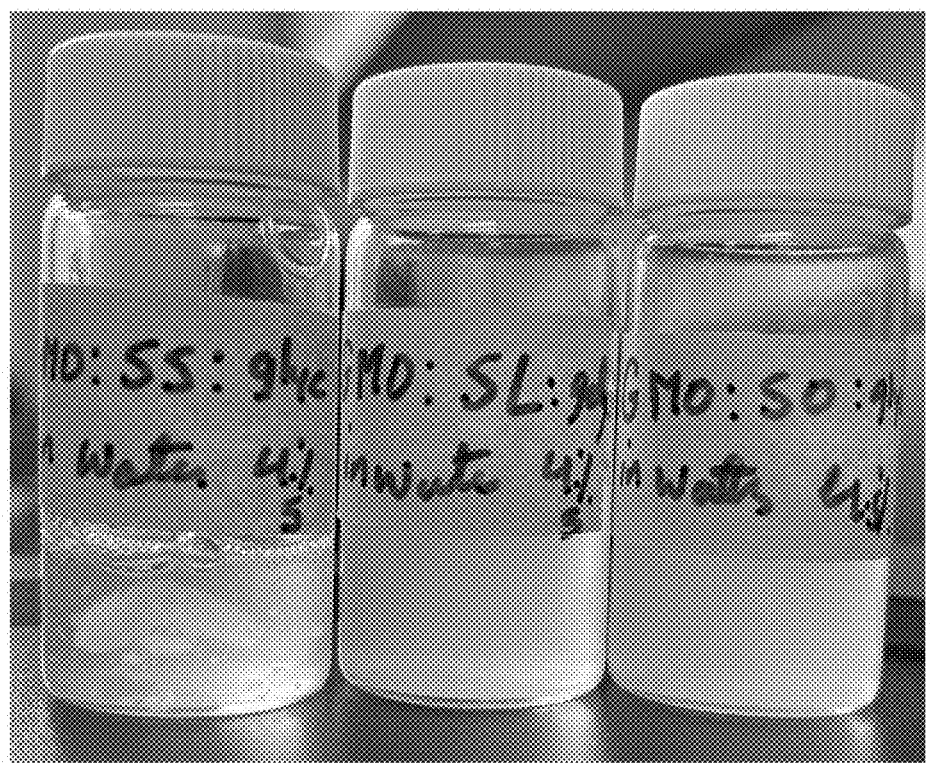
FIG. 27 is a photograph of 1.35 wt % solutions of glyceryl monooleate (GMO) with sodium stearate (SS), sodium laurate (SL) and sodium oleate (SO) in water at a GMO:fatty acid salt ratio of 1:19 (w/w) for all systems.

GMO mixtures with the different fatty acid salts used in this study were clearly different. Mixtures containing 1.35 wt % GMO and 0.0675 wt % fatty acid salt were prepared by adding the components together and heating above their corresponding fatty acid salt Krafft temperatures until a clear solution was observed. Upon cooling after overnight storage at room temperature, the solutions appeared as shown in FIG. 27. The GMO+SS mixture showed complete precipitation and phase separation of the GMO. This was indicative of the inability of sodium stearate to solubilize the GMO. Since the Krafft temperatures of GMO and SS are so different, the two molecules do not form a mixed gel below the Krafft temperature of the GMO. The SS precipitated out of solution upon cooling and is not entrapped within the GMO gel structure. As previously discussed, the GMO and the fatty acid salts must interact and form a "mixed micelle" (mixed self-assembled lipidic structure) in water, which is liquid crystalline in nature.

For both GMO+SL and GMO+SO, the situation was different. No precipitate was observed, and the mixtures were stable at room temperature. Moreover, the optical properties of the solutions were quite unique, displaying a marked yellowish hue when light traveled through the solution. Depending on the viewing angle, the solutions also appeared blue and green. When looking closely, it also seemed that these solutions had liquid "sheets" of fluid, which made the solutions viscous under near-static conditions (gentle mixing). This prompted exploration of the microstructure of the solutions.

Light microscopy of the solutions was carried out using an OMAX model M838PL-C180U3 light microscope (OMAX, Kent, WA, USA) with a 18 MP digital camera. A small drop of solution of the different mixtures of GMO and the fatty acid salt was placed onto a glass microscope slide and thinned with a plastic pipette. A coverslip was not used since we found this destroyed the structures we were interested in imaging. Images were captured using a 10× objective lens, using ToupView software (v3.7, ToupTek Photonics, Hangzhou, China). Samples were imaged in multiple locations to ensure accurate representation of the structures.

Figure 28:
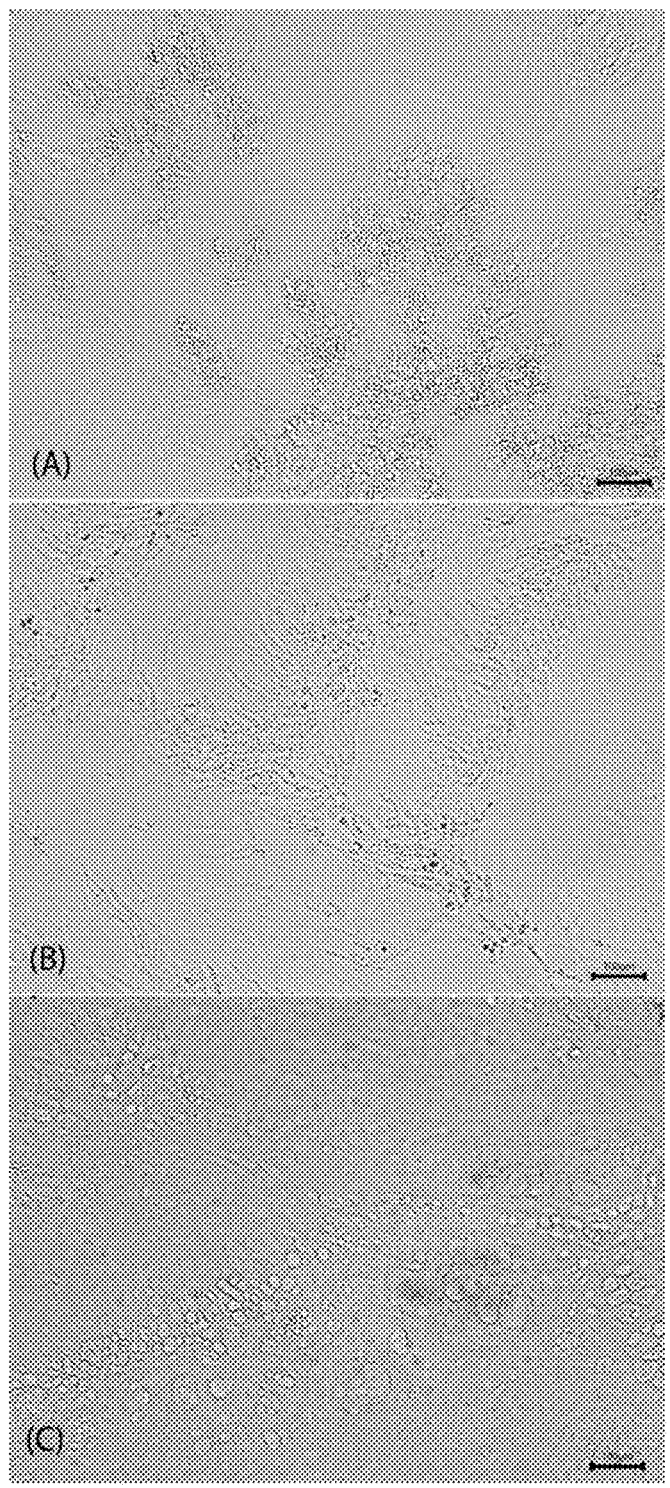
FIG. 28 are light micrographs of 1.35 wt % solutions of glyceryl monooleate (GMO) and (A) sodium oleate (SO), (B) sodium laurate (SL), and (C) sodium stearate in water, at a GMO:fatty acid salt ratio of 1:19 (w/w) for all systems. The magnification bar represents 100 μm.

FIG. 28 shows the results of the imaging efforts. FIG. 28A is an image of the GMO+SO microstructure, FIG. 28B is an image of the GMO+SL microstructure, while FIG. 28C is an image of the GMO+SS microstructure. Both GMO+SO and GMO+SL displayed very peculiar features, mostly characterized by aggregated clusters and very long cylindrical structures, vesicles or tubules. These types of macroscopic structures have been observed in other systems (Stobbs et al., Crystal Growth & Design 24 (2024) 2685-2699) upon self-assembly of phospholipids. These long, thin, cylindrical structures seemed to hold the rest of the structures together, functioning as some sort of like a fluid "glue" within the solution. This can explain the visual appearance of these solutions mentioned above, where the solutions seem to contain "sheets" of fluid. A complex interaction of light with these structures is probably responsible for the peculiar yellow/blue/green hue of the solution. In contrast, GMO+SS (FIG. 28C) did not display any of these long, thin, cylindrical structures. The microstructure was characterized by aggregates of GMO which had precipitated out of solution. The solution was also whitish and did not display the peculiar color of the GMO+SO and GMO+SL solutions.

It would seem that the formation of these long cylindrical structures is related to the functionality of the GMO mixtures with a fatty acid salt, since GMO+SO and GMO+SL were successfully used to provide a structured foam-based product, while GMO+SS did not work. The formation of these desirable microstructures is indicative of the formation of mixed "micelles" or "mixed self-assembled lipidic structures" above or near the Krafft temperature of the components.

Example 15. Concentrates of GMO and Fatty Acid Salts in Glycerol and Water for Manufacturing A concentrate of the GMO and fatty acid salt mixture was prepared that may be added directly to food formulations. The concentrate comprises hydrated and solubilized GMO and fatty acid salt for ready addition to food formulations. It was discovered that both the fatty acid salts, SO and SL, as well as the GMO, were soluble in glycerol, thus allowing for the manufacture of GMO+SO and GMO+SL glycerol gels which are microbiologically stable, and would possess an extended shelf-life due to the absence of water. Gels comprising 63.3 wt % GMO plus 3.3 wt % SO or SL in glycerol were prepared, as well as gels comprising 33 wt % GMO plus 1.65 wt % SO.

The preparation method involved dissolving the fatty acid salt in glycerol at a temperature of 60-70° C. until a clear solution was obtained. Hot GMO, at 70° C., was then added gradually to the fatty acid in glycerol solution, with mixing in a heated vessel. This kept the viscosity low and allowed for efficient mixing. Once the GMO was fully incorporated, the solution was left to cool statically at room temperature for 2 hours.

The following samples were prepared, 33 wt % GMO+ 1.65 wt % sodium oleate (SO) in glycerol and 63.3 wt % GMO+3.3 wt % sodium laurate (SL) in glycerol.

Synchrotron small-angle X-ray scattering (sSAXS), and wide-angle and near small-angle powder X-ray diffraction were carried out on the samples as described in Example 10.

Figure 29:
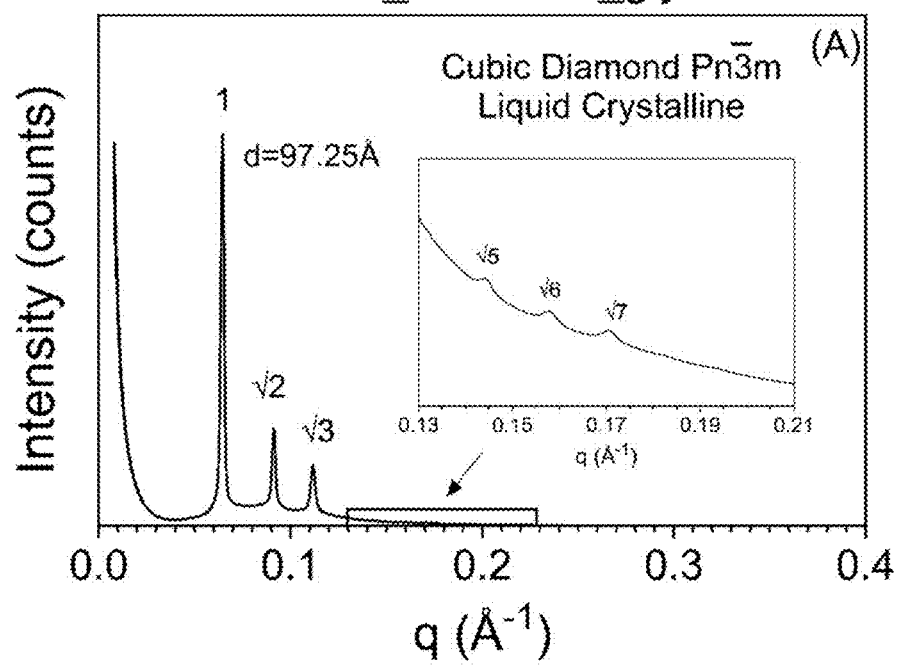
FIG. 29 graphically illustrates a synchrotron small-angle X-ray scattering spectrum of A) 33 wt % GMO+1.65 wt % sodium oleate (SO) in glycerol, and (B) 63.3 wt % GMO+ 3.3 wt % sodium laurate (SL) in glycerol.
Figure 29:
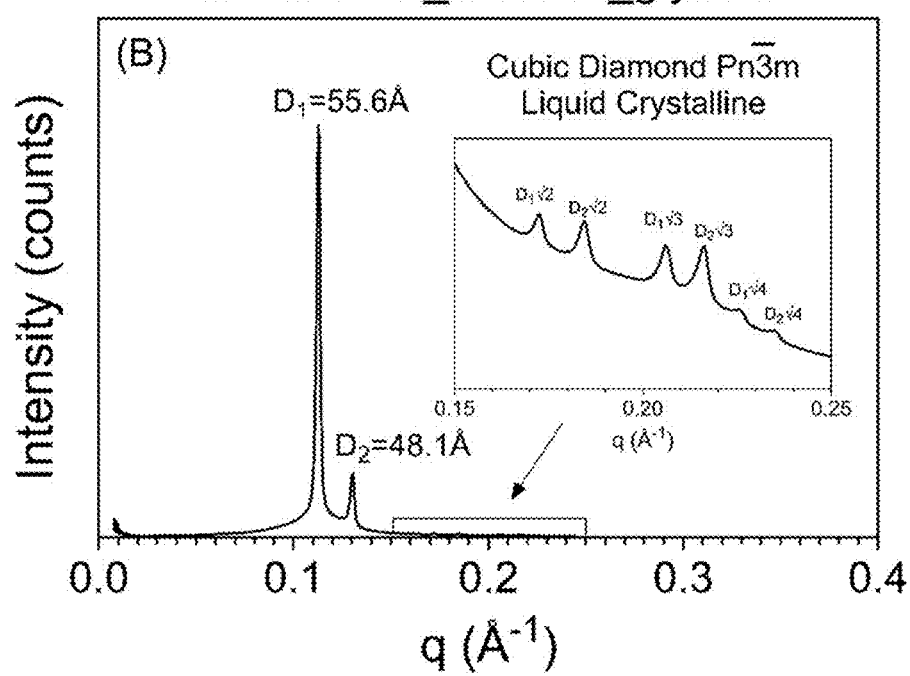

FIG. 29 shows sSAXS spectra of 33 wt % GMO+1.65 wt % sodium oleate (SO) in glycerol and 63.3 wt % GMO+3.3 wt % sodium laurate (SL) in glycerol. Both of these samples were in a cubic mesomorphic phase, as determined from the relative position of the scattering peak, as shown in the figure. This cubic glycerol gel can then be diluted in excess water (aqueous phase) to achieve a final concentration of 1-1.5 wt % GMO and 0.05-0.075 wt % fatty acid salt in a final food formulation. In excess water, above its Krafft temperature, the GMO+fatty acid salt mixture forms the liquid crystalline lamellar phase required for activity.

The invention claimed is:

1. A formulation comprising a structuring agent comprising the ingredients:
   i) glyceryl monooleate (GMO);
   ii) an oleic acid salt; and
   iii) a solvent,
   wherein 10-40wt % of a 96-99 wt % GMO:1-4 wt % oleic acid salt combination is mixed with solvent to form a mixed liquid crystalline lamellar phase at a temperature above the Krafft temperature of the GMO and oleic acid salt, and form a mixed self-assembled lamellar structure in a gel phase at a temperature below the Krafft temperature of the GMO and oleic acid salt,
   wherein the mixed self-assembled lamellar structure is combined with one or more secondary ingredients to form the formulation.

2. The formulation of claim 1, wherein the GMO and oleic acid salt are combined in the solvent in an amount of 97-99 wt % and 1-3 wt %, respectively.

3. The formulation of claim 1, wherein the oleic acid salt is a sodium, potassium, calcium or magnesium salt.

4. The formulation of claim 1, wherein the amount of GMO is 0.25-2 wt % of the formulation and the amount of oleic acid salt is in a range of 1-4 wt % of the amount of GMO.

5. The formulation of claim 1, additionally comprising one or more fats.

6. The formulation of claim 5, wherein the fats comprise vegetable fats and/or oils.

7. The formulation of claim 5, comprising fats in an amount in the range of about 0-25 wt % of the formulation.

8. The formulation of claim 1, additionally comprising a stability-enhancing ingredient in an amount in the range of about 0.05-10 wt %.

9. The formulation of claim 8, wherein the stability-enhancing ingredient is selected from the group consisting of starches and starch derivatives; flours; cellulose and derivatives thereof; microbial or vegetable gums; protein, protein isolate and/or protein concentrate; polysaccharides; cocoa powder; and mixtures thereof.

10. The formulation of claim 1, additionally comprising one or more of a sweetener, flavour, colorant, antioxidant, preservative, nutrient and/or a filler.

11. A food product comprising a formulation as defined in claim 1, and one or more of a stability-enhancing ingredient and a fat.

12. The food product of claim 11, wherein air is introduced into the combined ingredients to form a foam-based product.

13. The food product of claim 12, wherein the product is frozen.

14. The food product of claim 13, wherein the product exhibits an overrun of at least about 30%.

15. A method of making a structuring agent as defined in claim 1, comprising the steps of:
   i) heating a mixture comprising 10-40 wt % of a 96-99 wt % GMO:1-4 wt % oleic acid salt combination in solvent to a temperature above the Krafft temperature of the GMO and oleic acid salt to form a solution comprising a lamellar structure in a liquid crystalline state;
   ii) optionally homogenizing, pasteurizing, and/or hydrating ingredients in the solution; and
   ii) cooling the solution to yield the structuring agent.

16. The method of claim 15, comprising introducing air into the cooled solution to form a foam-based product, and optionally freezing the foam-based product.

17. The method of claim 15, comprising adding to the mixture or solution one or more additional ingredients selected from the group consisting of a stability-enhancing ingredient, fat, sweetener, flavour, color, antioxidant, preservative, nutrient and/or filler.

18. The formulation of claim 1, wherein the mixed self-assembled lamellar structure comprises bilayers 32-35 Angstroms in size.

* * * * *